US012289759B2

United States Patent
Wang

(10) Patent No.: US 12,289,759 B2
(45) Date of Patent: Apr. 29, 2025

(54) BEAM SELECTION IN UNLICENSED OPERATION

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 305 days.

(21) Appl. No.: 17/792,818

(22) PCT Filed: Jan. 15, 2021

(86) PCT No.: PCT/EP2021/050795
§ 371 (c)(1),
(2) Date: Jul. 14, 2022

(87) PCT Pub. No.: WO2021/148319
PCT Pub. Date: Jul. 29, 2021

(65) Prior Publication Data
US 2023/0058492 A1     Feb. 23, 2023

Related U.S. Application Data

(60) Provisional application No. 62/964,904, filed on Jan. 23, 2020.

(51) Int. Cl.
*H04W 74/08*     (2024.01)
*H04B 7/06*     (2006.01)
(Continued)

(52) U.S. Cl.
CPC ...... *H04W 74/0808* (2013.01); *H04B 7/0695* (2013.01); *H04W 74/0833* (2013.01)

(58) Field of Classification Search
CPC .......... H04W 74/0808; H04W 74/0833; H04B 7/0695
See application file for complete search history.

(56) References Cited

U.S. PATENT DOCUMENTS

| 2018/0176948 A1* | 6/2018 | Islam | ................... H04W 52/242 |
| 2020/0015236 A1* | 1/2020 | Kung | ................... H04B 17/318 |
| 2021/0120585 A1 | 4/2021 | Yang et al. | |

FOREIGN PATENT DOCUMENTS

| WO | 2019192613 A1 | 10/2019 |
| WO | 2019210185 A1 | 10/2019 |
| WO | 2020164079 A1 | 8/2020 |

OTHER PUBLICATIONS

"3GPP TS 36.213 V16.0.0", 3rd Generation Partnership Project; Technical Specification Group Radio Access Network; Evolved Universal Terrestrial Radio Access (E-UTRA); Physical layer procedures (Release 16), Dec. 2019, pp. 1-568.
(Continued)

*Primary Examiner* — Brenda H Pham
(74) *Attorney, Agent, or Firm* — Murphy, Bilak & Homiller, PLLC

(57) ABSTRACT

The invention includes a method performed by a user equipment, UE, for selecting a directional beam for a random access procedure in a wireless network comprising: performing a plurality of directional listen-before-talk, LBT, procedures in a respective plurality of different directions associated with a respective plurality of beams, determining respective first metrics based on received power of respective reference signals associated with the respective beams, determining respective second metrics based on channel occupancy, CO, or LBT failures in the respective beams and selecting one of the beams to be used for the random access procedure based on the first metrics and the second metrics. The invention further includes a complementary method performed by a network node, as well as a UE and a network node configured to perform operations corresponding to such methods.

14 Claims, 10 Drawing Sheets

(51) Int. Cl.
*H04W 74/0808* (2024.01)
*H04W 74/0833* (2024.01)

(56) References Cited

OTHER PUBLICATIONS

"3GPP TS 38.401 V15.7.0", 3rd Generation Partnership Project; Technical Specification Group Radio Access Network; NG-RAN; Architecture description (Release 15), Dec. 2019, pp. 1-47.
"New SID: Study on supporting NR from 52.6GHz to 71 GHz", 3GPP TSG RAN Meeting #86, RP-193259, Sitges, Spain, (revision of RP-193258), Dec. 9-12, 2019, pp. 1-3.
"3GPP TS 38.321 V15.7.0", 3rd Generation Partnership Project; Technical Specification Group Radio Access Network; NR; Medium Access Control (MAC) protocol specification (Release 15), Sep. 2019, pp. 1-78.
"3GPP TS 36.300 V15.7.0", 3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 15), Sep. 2019, pp. 1-295.

"3GPP TS 38.331 V15.8.0", 3rd Generation Partnership Project; Technical Specification Group Radio Access Network; NR; Radio Resource Control (RRC) protocol specification (Release 15), Dec. 2019, pp. 1-532.
"3GPP TR 38.889 V16.0.0", 3rd Generation Partnership Project; Technical Specification Group Radio Access Network; Study on NR-based access to unlicensed spectrum (Release 16), Dec. 2018, pp. 1-119.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.
"3GPP TS 38.211 V15.7.0", 3rd Generation Partnership Project; Technical Specification Group Radio Access Network; NR; Physical channels and modulation (Release 15), Sep. 2019, pp. 1-97.
"3GPP TS 38.213 V15.7.0", 3rd Generation Partnership Project; Technical Specification Group Radio Access Network; NR; Physical layer procedures for control (Release 15), Sep. 2019, pp. 1-108.
"3GPP TS 38.214 V15.7.0", 3rd Generation Partnership Project; Technical Specification Group Radio Access Network; NR; Physical layer procedures for data (Release 15), Sep. 2019, pp. 1-106.

* cited by examiner

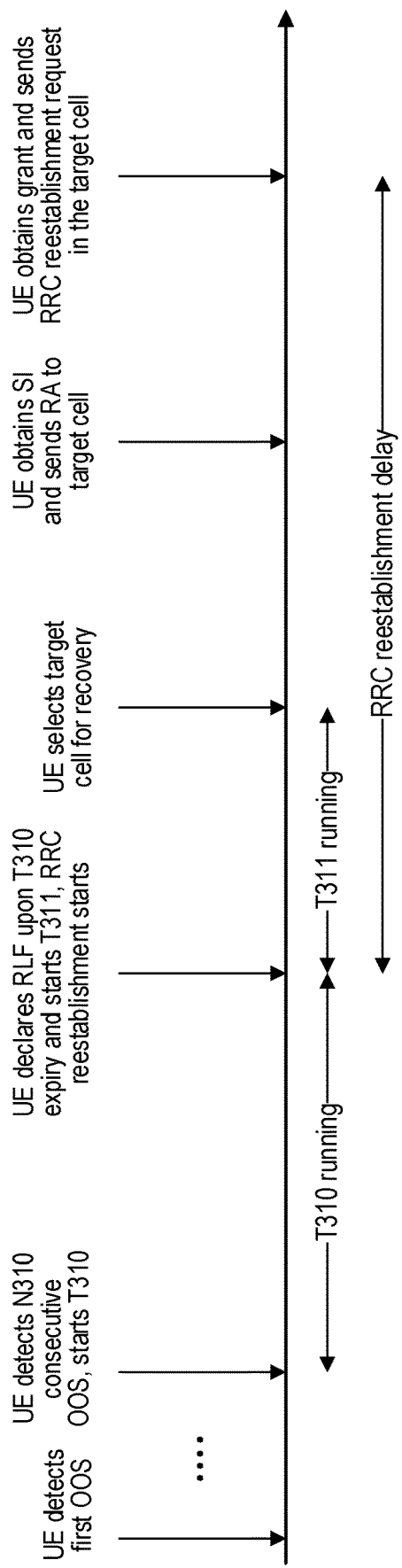

*FIG. 7*

Configuring one or more UEs with information that facilitates selection, by each UE, of a beam to be used for a random access procedure in the wireless network, including: first thresholds related to UE received power of respective reference signals associated with a respective plurality of beams in a respective plurality of directions; second thresholds related to UE channel occupancy (CO) or listen-before-talk (LBT) failures in the respective beams; and/or conditions for UE beam reselection based on a number of UE LBT failures and/or a time between successful UE LBT procedures on each respective beam. — 1310

Transmitting the plurality of beams, including the associated reference signals, in the respective plurality of directions. — 1320

*FIG. 13*

BEAM SELECTION IN UNLICENSED OPERATION

TECHNICAL FIELD

Embodiments of the present disclosure generally relate to wireless communication networks, and particularly relate to performance improvements to operation of wireless devices (e.g., user equipment or UEs) in unlicensed spectrum.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases too. The present disclosure relates generally to NR, but the following description of previous-generation technology is provided for context since it shares many features with NR.

Long-Term Evolution (LTE) is an umbrella term for so-called fourth-generation (4G) radio access technologies developed within 3GPP and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC— and high-level functional division into the Access Stratum (AS) and the Non-Access Stratum (NAS). FIG. 2A also illustrates two interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE HE is known in the EPC and has an assigned IP address, but is not known to the serving eNB (e.g., there is no stored context).

Generally speaking, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3, or 4) is known as the Control Format Indicator (CFI) indicated by the PCFICH transmitted in the first symbol of the control region.

While LTE was primarily designed for user-to-user communications, 5G/NR cellular networks are envisioned to support both high single-user data rates (e.g., 1 Gb/s) and large-scale, machine-to-machine (M2M) communication involving short, bursty transmissions from many different devices that share the frequency bandwidth. The NR radio standards are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. NR also shares various other features of LTE that were discussed above.

NR targets operation in both licensed and unlicensed bands, and a work item named NR-based Access to Unlicensed Spectrum (NR-U) was started in January 2019. Allowing unlicensed networks (i.e., networks that operate in spectrum not licensed to the operator such that it must be shared) to effectively use available spectrum is an attractive approach to increase system capacity. Although unlicensed spectrum does not match the quality of licensed (e.g., unshared) spectrum, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations.

In addition to providing coverage via "cells," as in previous generations, NR networks will also provide coverage via "beams." As used herein, "beam" refers to a coverage area of a reference signal that may be measured by a UE. In NR, for example, such reference signals can include any of the following, alone or in combination: SS/PBCH block (SSB), channel state information reference signal (CSI-RS), tertiary reference signals (or any other sync signal), positioning RS (PRS), demodulation RS (DMRS), etc.

Before a UE transmits in unlicensed spectrum, it typically needs to perform a listen-before-talk (LBT) or a clear channel assessment (CCA). In general, a UE selects a beam for operation based on a measured downlink (DL) reference signal received power (RSRP), e.g., SS-RSRP for SSB or CSI-RSRP for CSI-RS. However, there are various issues, drawbacks, and/or problems with this conventional approach for beam selection when used in combination with LBT procedures for unlicensed frequency bands.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods (e.g., procedures) for selecting a directional beam for a random access procedure in a wireless network, according to various exemplary embodiments of the present disclosure. These exemplary methods can be performed by a user equipment (UE, e.g., wireless device, IoT device, modem, etc. or component thereof) in communication with a network node (e.g., base station, eNB, gNB, en-gNB, etc., or component thereof) in the wireless network e.g., E-UTRAN, NG-RAN).

These exemplary methods can include performing a plurality of directional listen-before-talk (LBT) procedures in a respective plurality of different directions associated with a respective plurality of beams. The UE can perform these directional LBT procedures, for example, when the UE wants to select a beam for a RA procedure such as part of an RRC reestablishment and/or when the UE has uplink data for transmission to the wireless network.

In some embodiments, the directional LBT procedures can be performed in unlicensed frequency spectrum. In such embodiments, the wireless network can be one of the following: an NG-RAN configured to support NR-U operation; or an E-UTRAN configured to support LTE-LAA operation.

These exemplary methods can also include determining respective first metrics based on received power of respective reference signals associated with the respective beams. In some embodiments, the respective reference signals can include SSB/PBCH Block (SSB) and/or channel state information reference signals (CSI-RS). In some embodiments, the determining operations can include measuring reference signal received power (RSRP) of the respective reference signals. In such embodiments, the RSRP measurements can comprise the first metrics.

These exemplary methods can also include determining respective second metrics based on channel occupancy (CO) or LBT failures in the respective beams. In some embodiments, the determining operations can include one of the following, for each of the respective second metrics: determining the second metric based on success or failure of the LBT procedure on the corresponding beam; or receiving the second metric from a network node in the wireless network.

These exemplary methods can also include selecting one of the beams, for the random access procedure, based on the first metrics and the second metrics. In some embodiments, the selected beam can fulfill the following conditions:
 a received power value of the associated reference signal is above a first pre-defined threshold associated with the first metrics; and
 either a CO value of the associated reference signal is above a second pre-defined threshold associated with the second metrics, or an LBT failure value is below a second pre-defined threshold associated with the second metrics.

In some embodiments, the selection operations can include selecting a first set of the beams having respective first metrics greater than a first threshold and, when the first set is not empty, selecting, from the first set, the beam having the lowest second metric. In some of these embodiments, the selection operations can also include, when the first set is empty, selecting the beam having the lowest second metric.

In other embodiments, the selection operations can include selecting a first set of the beams having respective first metrics greater than the first threshold and respective second metrics less than a second threshold and, when the first set is not empty, selecting, from the first set, a beam based on one of the following criteria:
 randomly;
 a beam with the highest first metric; or
 a beam with the lowest second metric.

In some of these embodiments, the selection operations can also include, when the first set is empty, selecting a second set of beams having respective second metrics less than the second threshold and, when the second set is not empty, selecting one of the beams based on one of the following criteria:
 randomly; or
 a beam having the lowest second metric of the second set.

In some of these embodiments, the selection operations can also include, when the first set and the second set are empty, selecting one of the beams based on one of the following criteria:
 randomly; or
 a beam having the lowest second metric.

In some embodiments, the UE can be served by a first beam. In such embodiments, the selection operations can be for selecting a beam other than the first beam and can be in response to one of the following:
 a count of consecutive LBT failures, on the first beam, has exceeded a maximum amount; or
 expiration of a timer without a successful LBT procedure on the first beam while the timer was running.

Other exemplary embodiments include methods (e.g., procedures) for configuring random access procedures by user equipment (UEs) in a wireless network. These exemplary methods can be performed by a network node (e.g., base station, eNB, gNB, en-gNB, etc., or component thereof) in the wireless network (e.g., E-UTRAN, NG-RAN).

These exemplary methods can include configuring one or more UEs with information that facilitates selection, by each UE, of a beam to be used for a random access procedure in the wireless network. The information can include one or more of the following:
 first thresholds related to UE received power of respective reference signals associated with a respective plurality of beams in a respective plurality of directions;
 second thresholds related to UE channel occupancy, CO, or listen-before-talk, LBT, failures in the respective beams; and
 one or more conditions for UE beam reselection based on a number of UE LBT failures and/or a time between successful UE LBT procedures on each respective beam.

In some embodiments, the one or more conditions can include one or more of the following:
 a maximum count of consecutive UE LBT failures, on each of the respective beams, that triggers UE beam reselection; and
 a maximum time between successful UE LBT procedures, on each of the respective beams, that triggers UE beam reselection.

In some embodiments, these exemplary methods can also include transmitting the plurality of beams, including the associated reference signals, in the respective plurality of directions. In some embodiments, the respective reference signals can include SSB/PBCH Block (SSB) and/or channel state information reference signals (CSI-RS).

In some embodiments, the respective reference signals associated with the respective beams can be in unlicensed frequency spectrum. In such embodiments, the wireless network can be one of the following: an NG-RAN configured to support NR-U operation (e.g., above 52.6 GHz, as discussed above); or an E-UTRAN configured to support LTE LAA operation (e.g., around 5 GHz).

Other exemplary embodiments include user equipment (UEs, e.g., wireless devices, IoT devices, or components thereof, such as a modem) and network nodes (e.g., base stations, eNBs, gNBs, en-gNBs, etc., or components thereof) configured to perform operations corresponding to any of the exemplary methods described herein. Other exemplary embodiments include non-transitory, computer-readable media storing program instructions that, when executed by processing circuitry, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7 shows a timeline of any exemplary radio link monitoring (RLM) procedure for LTE.

FIG. 13 shows a flow diagram of an exemplary method (e.g., procedure) performed by a network node (e.g., base station, eNB, gNB, en-gNB, etc., or component thereof), according to various exemplary embodiments of the present disclosure.

DETAILED DESCRIPTION

Figure 1:
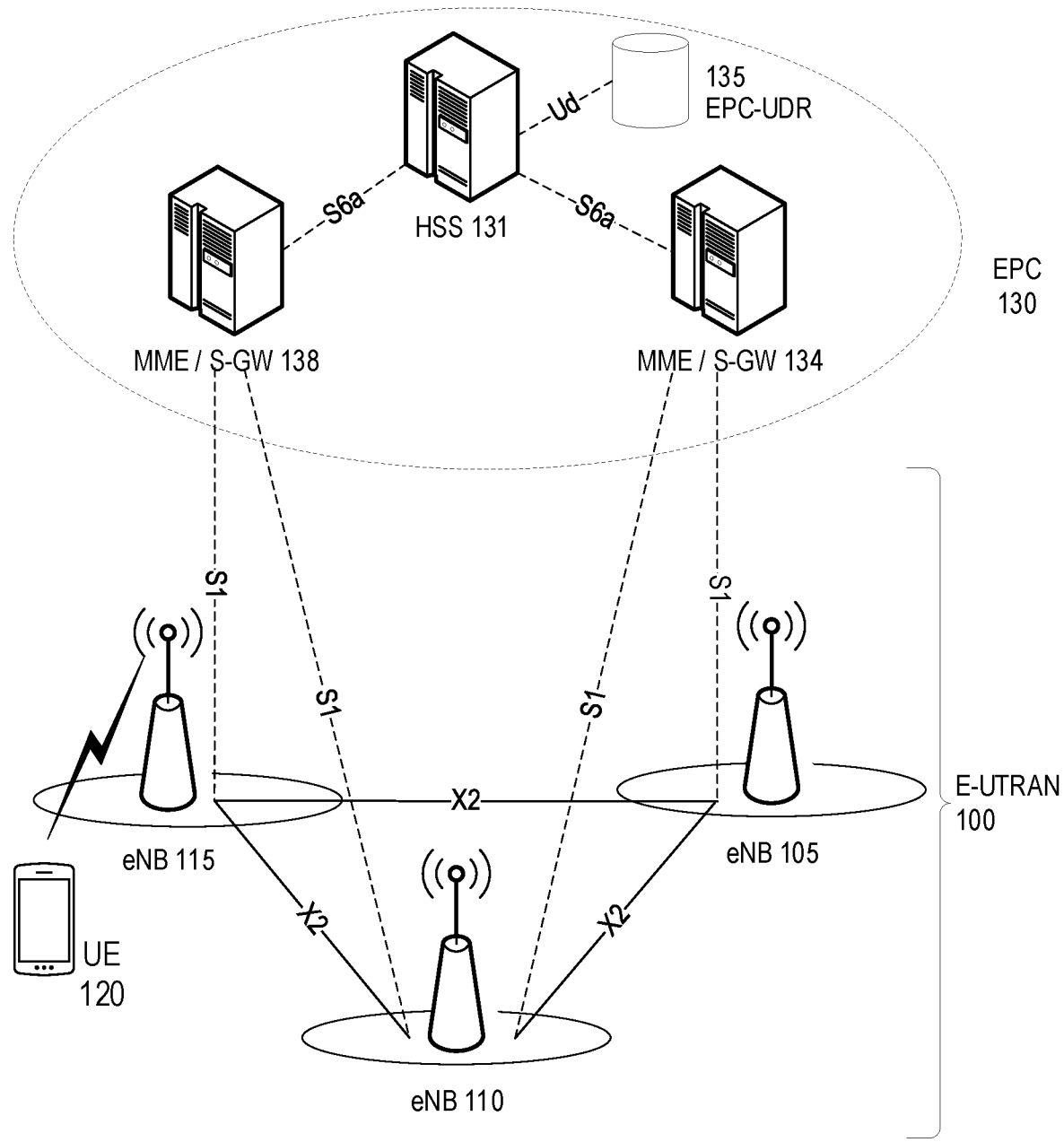
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
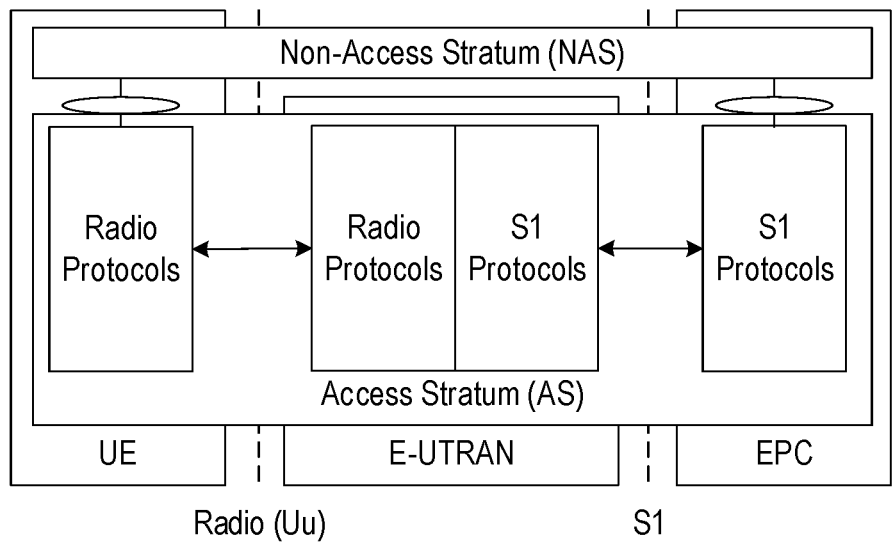
FIG. 2A is a high-level block diagram of an exemplary E-UTRAN architecture in terms of its constituent components, protocols, and interfaces.
Figure 2B:
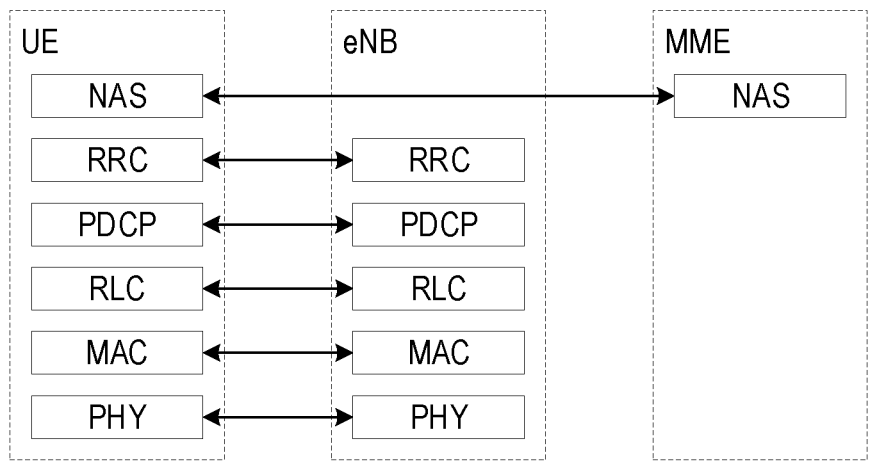
FIG. 2B is a block diagram of exemplary protocol layers of the control-plane portion of the radio (Uu) interface between a user equipment (UE) and the E-UTRAN.
Figure 2C:
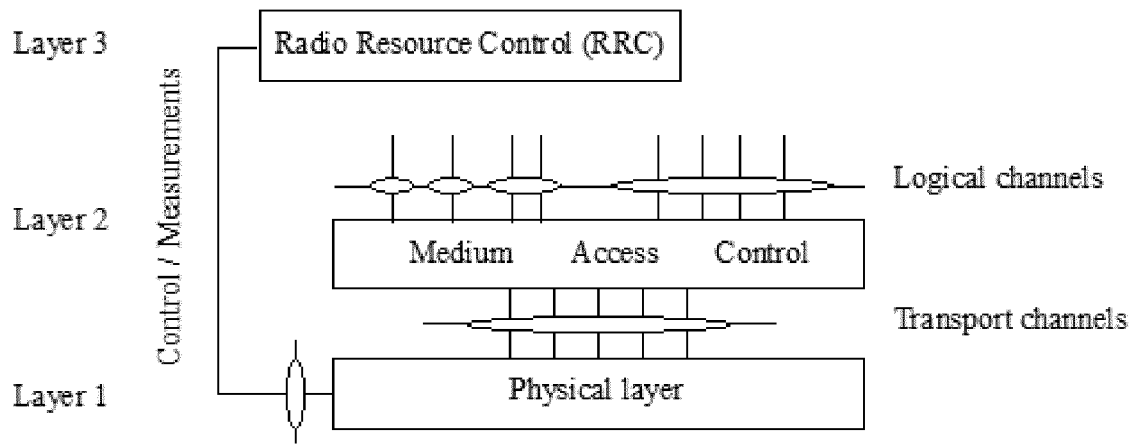
FIG. 2C is a block diagram of an exemplary LTE radio interface protocol architecture from the perspective of the PHY layer.
Figure 3A:
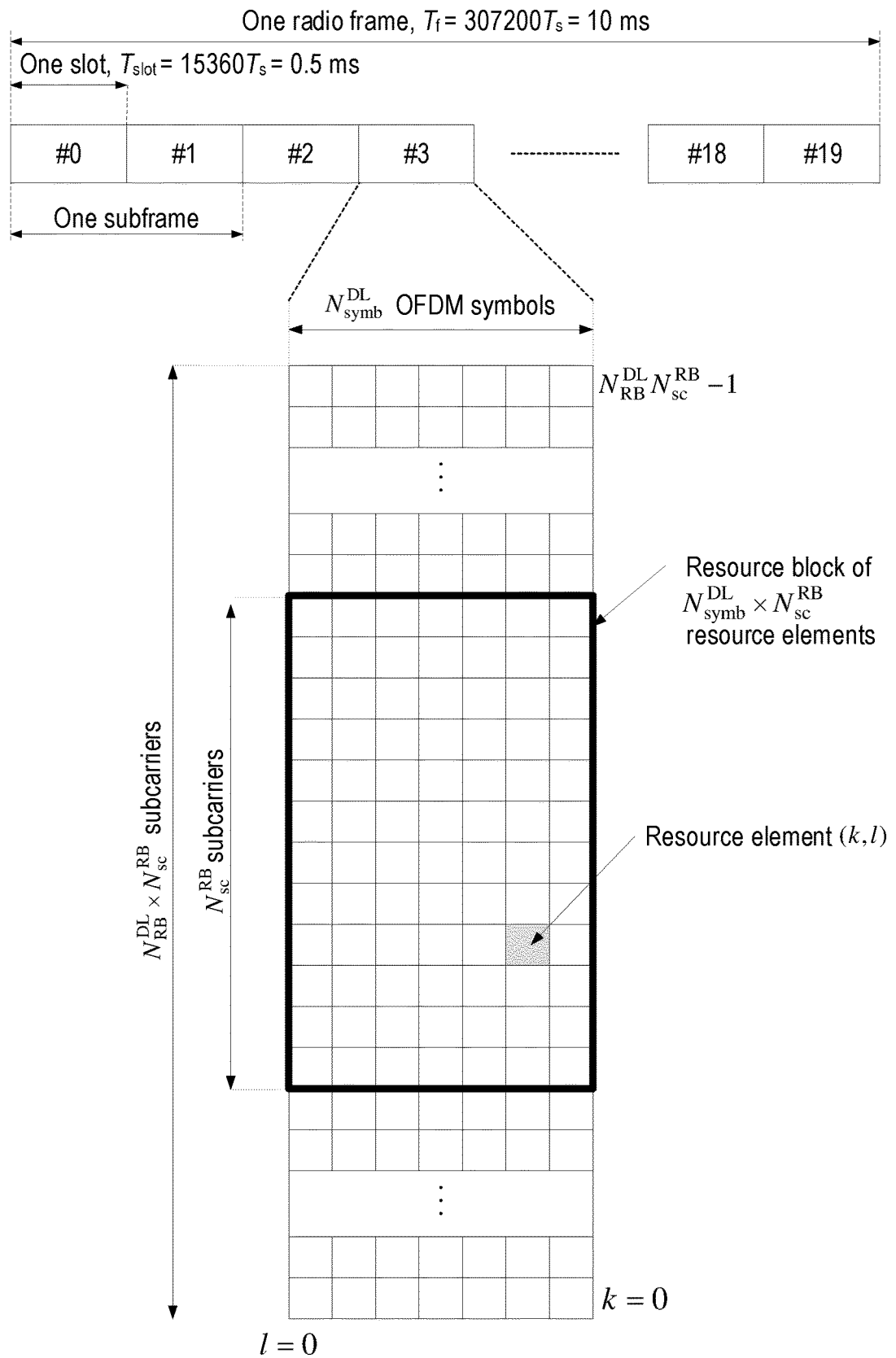
FIGS. 3A and 3B are block diagrams, respectively, of exemplary downlink and uplink LTE radio frame structures used for frequency division duplexing (FDD) operation.
Figure 3B:
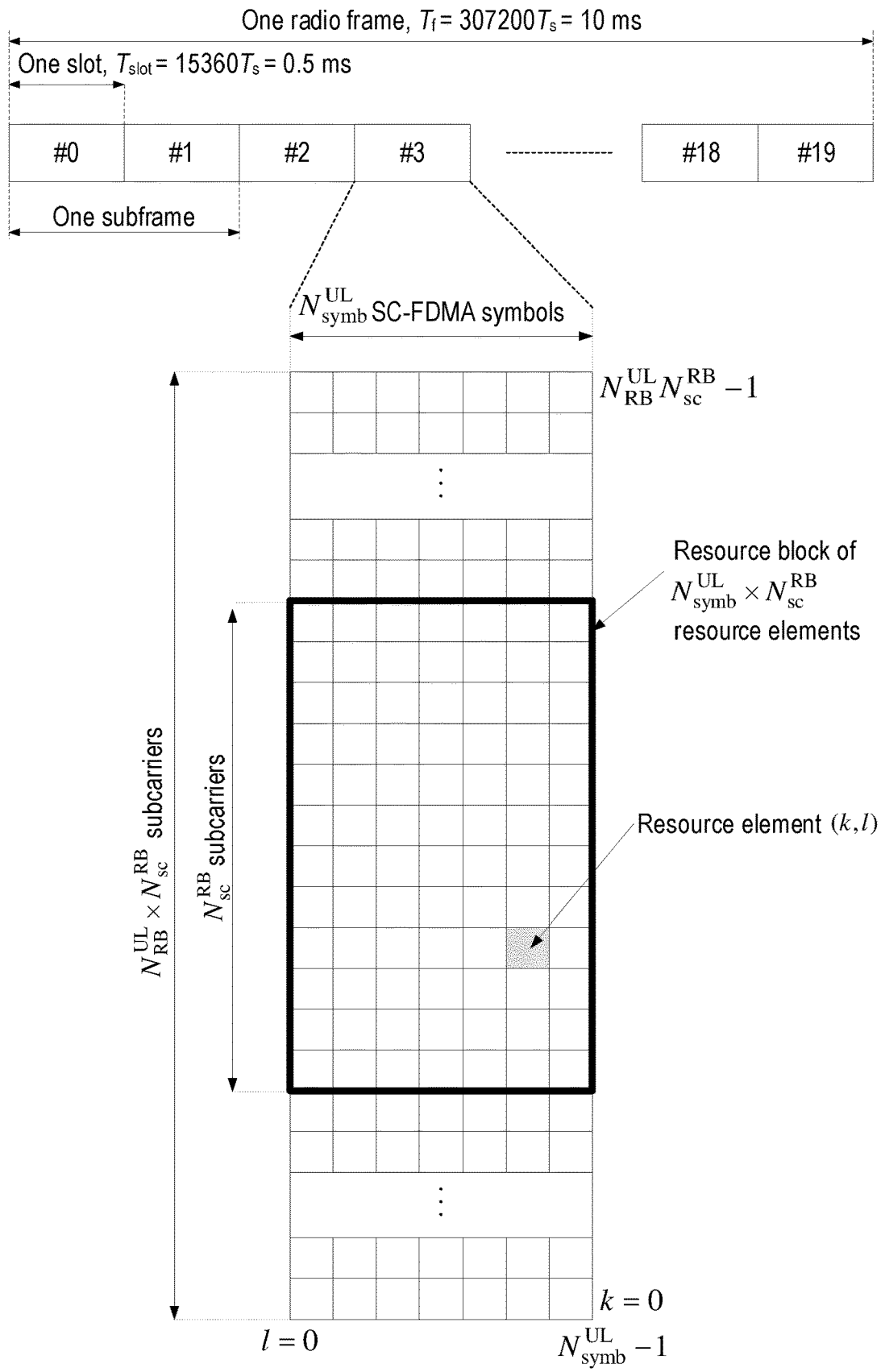

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, various terms discussed below will be used throughout the application.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term "radio network node" can refer to any type of network node that can comprise any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH).

In some embodiments, a TRP may be associated with a network node or radio network node. In some embodiments, a multi-TRP scenario may include more than one TRPs associated with one or more network nodes.

Note that although terminology from one particular wireless system (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, aerial device (e.g., drone), ProSe UE, V2V UE, V2X UE, etc.

Unless otherwise noted, functions described herein as being performed by a WD, UE, network node, radio network node, etc. can be distributed over a plurality of devices and/or network nodes. In other words, it is contemplated that the functions of the network node and WD described herein are not limited to performance by a single physical device and, in fact, can be distributed among several physical devices.

Unless otherwise noted, the term "time resource" can correspond to any type of physical resource or radio resource expressed in terms of length of time or time interval or time duration. In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbol, time slot, minislot, subframe, radio frame, transmission time interval (TTI), interleaving time, a time resource number, etc.

Unless otherwise noted, the term "TTI" can correspond to any time period over which a physical channel can be encoded and interleaved for transmission (e.g., during the TTI). The physical channel can be decoded by the receiver over the same time period (TO) over which it was encoded. The TTI may also interchangeably called as short TTI (sTTI), transmission time, slot, sub-slot, mini-slot, short subframe (SSF), mini-subframe etc.

In some embodiments, a transmitter (e.g., network node) and a receiver (e.g., WD) can have a common, predetermined understanding about rule(s) for determining which resources to be arranged for transmission and/or reception of one or more physical channels. Such rules may, in some embodiments, be referred to as "mapping." In other embodiments, the term "mapping" may have other meanings.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, in particular if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G/NR) beams may be used instead of cells and, as such, concepts described herein apply equally to both cells and beams.

As briefly mentioned above, before a UE transmits in unlicensed spectrum, it typically needs to perform a listen-before-talk (LBT) or a clear channel assessment (CCA). In general, a UE selects a beam for operation based on a measured downlink (DL) reference signal received power (RSRP), e.g., SS-RSRP for SSB or CSI-RSRP for CSI-RS. However, there are various issues, drawbacks, and/or problems with this conventional approach for beam selection when used in combination with LBT procedures for unlicensed frequency bands. This is discussed in more detail below.

In Rel-15 NR, a UE can be configured with up to four carrier bandwidth parts (BWPs) in the downlink (DL) with a single DL carrier BWP being active at a given time. A BWP consists of a group of contiguous PRBs, and a bandwidth of a BWP is equal to or is smaller than the maximal bandwidth capability supported by a UE. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

NR also supports flexible bandwidth configurations for different UEs on the same serving cell. In addition, the bandwidth monitored by a UE and used for its control channels (e.g., PDCCH) and data channels (e.g., PDSCH) may be smaller than the carrier bandwidth. Reserved resources can be configured within a BWP.

Figure 4:
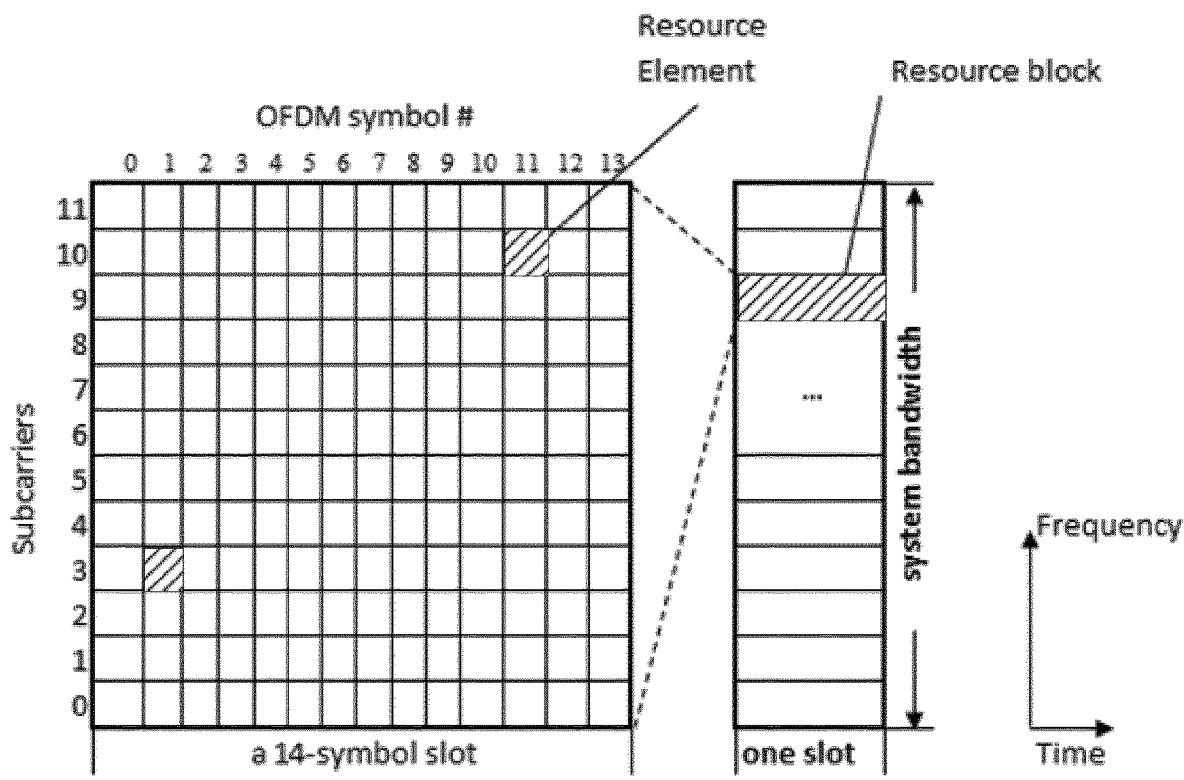
FIG. 4 shows an exemplary time-frequency resource grid for a New Radio (NR) slot.

FIG. 4 shows an exemplary time-frequency resource grid for an NR slot. As illustrated in FIG. 4, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP,i}^{size}-1$, where i is the index of the particular BWP for the carrier. Similar to LTE, each NR resource element (RE) corresponds to one OFDM subcarrier during one OFDM symbol interval. николаNR supports various SCS values $\Delta f=(15\times 2^\mu)$ kHz, where $\mu\in(0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $1/2^\mu$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu*180$ kHz.

Table 1 below summarizes the supported NR numerologies and associated parameters. Different DL and UL numerologies can be configured by the network.

TABLE 1

| μ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 5A:
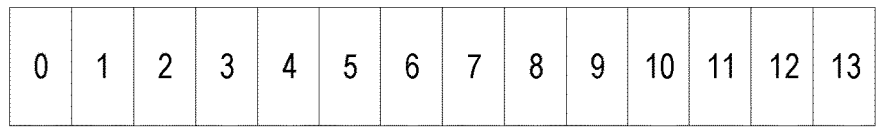
FIGS. 5A-5B shows various exemplary NR slot configurations.

An NR slot can include 14 OFDM symbols for normal cyclic prefix and 12 symbols for extended cyclic prefix. FIG. 5A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 5B:
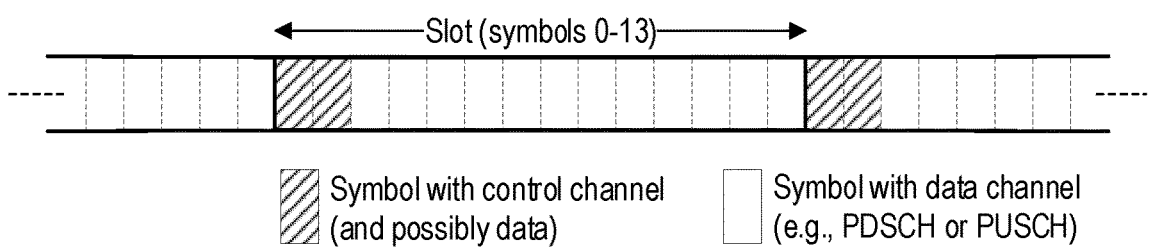

FIG. 5B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission.

It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

In addition to dynamic scheduling on a per-slot basis, discussed above, NR also supports semi-persistent scheduling in the DL. In this approach, the network configures a periodicity of PDSCH transmission via RRC and then controls the start and stop of transmissions via DCI in PDCCH. One advantage of this technique is reduction of control signaling overhead on PDCCH. NR also supports a similar feature on the UL, referred to as configured grants (CG). In general, CG type 2 is similar to DL semi-persistent scheduling in downlink (e.g., RRC plus DCI) while CG type 1 is controlled by only RRC, including the start and stop of transmissions.

Figure 6:
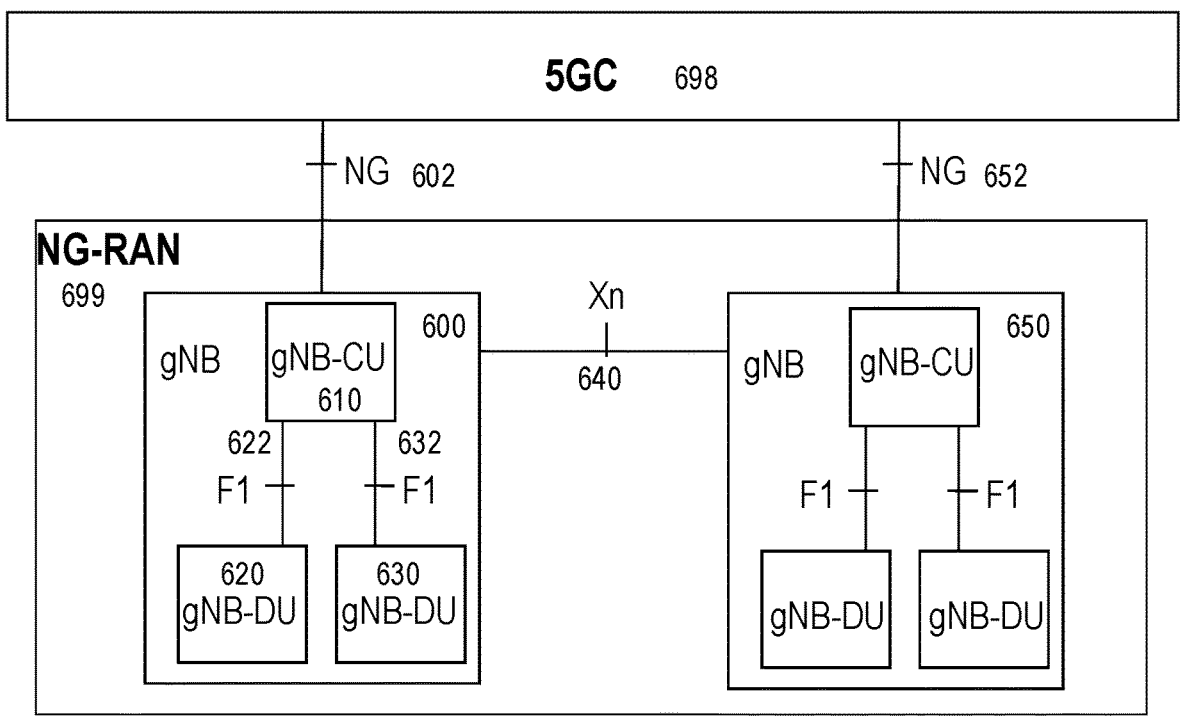
FIG. 6 illustrates a high-level view of a 5G network architecture.

FIG. 6 illustrates a high-level view of the 5G network architecture, consisting of a Next Generation RAN (NG-RAN) 699 and a 5G Core (5GC) 698. NG-RAN 699 can include a set of gNodeB's (gNBs) connected to the 5GC via one or more NG interfaces, such as gNBs 600, 650 connected via interfaces 602, 652, respectively. In addition, the gNBs can be connected to each other via one or more Xn interfaces, such as Xn interface 640 between gNBs 600 and 650. With respect to the NR interface to UEs, each of the gNBs can support frequency division duplexing (FDD), time division duplexing (TDD), or a combination thereof.

The NG RAN logical nodes shown in FIG. 6 (and described in 3GPP TS 38.401 and 3GPP TR 38.801) include a central (or centralized) unit (CU or gNB-CU) and one or more distributed (or decentralized) units (DU or gNB-DU). For example, gNB 600 in FIG. 6 includes gNB-CU 610 and gNB-DUs 620 and 630. CUs (e.g., gNB-CU 610) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 622 and 632 shown in FIG. 6. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

As briefly mentioned above, NR targets operation in unlicensed bands, referred to generally as NR-U. It is expected that some existing features in NR will need to be adapted for NR-U to comply with the special characteristics of the unlicensed band as well as different regulations. SCS of 15 or 30 kHz are the most promising candidates for NR-U OFDM numerologies for frequencies below 6 GHz.

For a node to be allowed to transmit in unlicensed spectrum, it typically needs to perform a listen-before-talk (LBT) or a clear channel assessment (CCA). For example, in the 5 GHz band, the sensing is done over 20-MHz channels. In general, the MAC layer initiates a transmission and requests the PHY layer to initiate the LBT procedure. After completion, the PHY layer indicates the LBT outcome (e.g., success or failure). This procedure can include sensing the medium as idle for a number of time intervals, which can be done in various ways including energy detection, preamble detection, or virtual carrier sensing.

In virtual carrier sensing, the node reads control information from other transmitting nodes informing when a transmission ends. After sensing the medium idle, a node is typically allowed to transmit for a certain amount of time, referred to as transmission opportunity (TXOP). The length of the TXOP depends on regulation and type of CCA that has been performed, but typically ranges from 1 ms to 10 ms.

In the energy detection (ED) technique used in NR-U, the transmitter looks for the energy level in channel over a time period compared to a certain threshold (ED threshold) in order to determine if the channel is idle or occupied/busy. If the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has gained access to a channel, the transmitter is only allowed to perform transmission up to a maximum time duration (i.e., maximum channel occupancy time, MCOT). For quality of service (QoS) differentiation, a channel access priority based on the service type has been defined. For example, four LBT priority classes are defined for differentiation of contention window sizes (CWS) and MCOT between services.

Some devices (e.g., UEs) may be capable of transmitting (and receiving) over a wide bandwidth including multiple sub-bands/channels. A device is only allowed to transmit on the sub-bands in which the medium is sensed as free. As with single bands, there are various ways LBT sensing should be done when multiple sub-bands are involved. In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as single channel with a larger bandwidth. The other way is that the device operates almost independent processing chains for each channel. Depending on how independent the processing chains are, this option can be referred to as either carrier aggregation (CA) or dual connectivity (DC).

License Assisted Access (LAA) is a feature of LTE that leverages the unlicensed 5 GHz band in combination with licensed spectrum to deliver a performance boost for mobile device users. It uses CA in the downlink to combine LTE in unlicensed 5-GHz band with LTE in the licensed band to provide better data rates and a better user experience. Since LAA operates in the 5-GHz band where Wi-Fi operates, it must be able to co-exist with Wi-Fi by avoiding channels that are being used by Wi-Fi users. LAA uses LBT to dynamically select a 5-GHz-band channel(s) that is(are) not being used—a "clear channel." If no clear channel is available, LAA will share a channel fairly with others.

In general, LTE LAA supports UE measurement reports for unlicensed spectrum based on measurements of averaged RSSI and channel occupancy (CO). In general, CO is defined as percentage of time that RSSI was measured above a configured threshold. For this purpose, a UE can be configured with a RSSI measurement timing configuration (RMTC) that includes a measurement duration (e.g., 1-5 ms) and a period between measurements (e.g. {40, 80, 160, 320, 640} ms). It has been agreed in NR-U to also support measurement of CO. The LTE LAA rules regarding CO are used as a baseline for NR-U.

The principle of radio link monitoring (RLM) is similar in LTE and NR. The purpose is to monitor the radio link quality of the UE's serving cell and use that information to decide whether the UE is in-sync (IS) or out-of-sync (OOS) with respect to that serving cell. One of the main intentions of RLF procedure in LTE was to assist the UE to perform a fast and reliable recovery in RRC CONNECTED state without going via RRC_IDLE. It is beneficial to avoid unnecessary latency due to the RACH access and RRC connection establishment from RRC_IDLE.

In LTE, RLM is carried out by UE measuring downlink reference signals (e.g., CRS) in RRC CONNECTED state. If RLM indicates number of consecutive OOS conditions, then the UE starts a radio link failure (RLF) procedure and declares RLF after expiry of a timer (e.g., T310). The actual procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

FIG. 7 shows a timeline of any exemplary radio link monitoring (RLM) procedure for LTE. In this example, the UE detects N310 consecutive OOS conditions and then initiates timer T310. After expiry of T310, the UE starts T311 and starts RRC reestablishment. After selecting a target cell for reestablishment, the UE obtains system information (SI) for the target cell and performs a random access (e.g., via RACH). Ultimately, the UE obtains access to the target cell and sends an RRC Reestablishment Request message to the target cell, with an overall delay after initiating reestablishment.

In addition to T310 expiry, an LTE UE may also experience RLF due to a reaching a maximum number of RLC retransmission or due to handover failure after timer T304 expiry. During handover procedure, T304 is started when the UE receives a handover command from the source cell, with the value of the timer T304 set to allow the UE to try the maximum random access attempts to the target cell. When the timer T304 is expired, a radio link failure due to handover is detected.

When a radio link failure is triggered for any of the above reasons, the radio connection re-establishment is triggered. An LTE UE shall first perform cell search to determine the best cell for radio link re-establishment. According to 3GPP TS 36.300, a UE can select the same cell, a different cell from the same eNB, or a prepared cell from a different eNB, wherein the activity can be resumed (i.e., the UE stays in connected mode) via radio connection re-establishment procedure since the previous UE context can be retrieved by inter-cell communication. In general, a prepared eNB (providing a "prepared cell") is an eNB which has admitted the UE during an earlier executed handover preparation phase or has obtained the UE's context.

However, when a prepared cell is not available, the UE selects an unprepared cell. In this case, the UE has to go to RRC_IDLE state and try to setup the radio connection afterwards. In this case, activity of the UE cannot be resumed. Table 2 below (which is Table 10.1.6-1 from 3GPP TS 36.300) guides the UE behavior for target cell selection.

TABLE 2

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same eNB | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |

In NR, Beam Failure recovery (BFR) is used to enable quick recovery from beam failure. Beam failure can happen for different reasons, such as sudden blocking of a DL beam or inefficient beam management procedures. The BFR procedure consists of several steps. In the first step, beam failure is detected in L1 (i.e., PHY) when the BLER of a (hypothetical) PDCCH is above a threshold for a certain time. In the second step, new candidate beams are identified by measuring beam identification RS, such as CSI-RS or SSB, that are above a threshold with respect to L1-RSRP on the measured RS.

In NR, the MAC entity's BFR procedure may be configured by RRC. Beam failure is detected by counting beam failure instance indication from the lower layers to the MAC entity. In the third step, L2 (e.g., MAC) is given the set of candidate beams and a BFR is triggered, which will initiate a random access procedure. Typically, this will trigger a contention free random access (CFRA) where the UE transmits a dedicated preamble on PRACH resources that are dedicated to BFR, and indicates which beam is selected. These dedicated PRACH resources are not dedicated to a specific UE but are common to all UEs who do CFRA for BFR, similar to PRACH resources dedicated to different SSBs for initial access.

Hence, by the dedicated preamble and dedicated PRACH resource, the gNB can conclude which UE transmitted the preamble, the reason for the transmission, and which new serving beam it indicates. In case the UE has no dedicated preamble for BFR, contention based random access (CBRA) should be used instead. In the last step, gNB transmits a response to the BFR on DPCCH addressed to the UE's cell radio network temporary identity (C-RNTI).

The MAC entity's operation in the BFR procedure can also be summarized by the following procedural statements, which can be part of a 3GPP specification:

```
*** Begin ***
The MAC entity shall:
  1>if beam failure instance indication has been received from lower
    layers:
    2>start or restart the beamFailureDetectionTimer;
    2>increment BFI_COUNTER by 1;
    2>if BFI_COUNTER >= beamFailureInstanceMaxCount:
      3>if beamFailureRecoveryConfig is configured:
        4>start the beamFailureRecoveryTimer, if configured;
        4>initiate a Random Access procedure (see subclause 5.1) on
          the SpCell by applying the parameters powerRampingStep,
          preambleReceivedTargetPower, and preambleTransMax
          configured in beamFailureRecoveryConfig.
      3>else:
        4>initiate a Random Access procedure (see subclause 5.1) on
          the SpCell.
  1>if the beamFailureDetectionTimer expires:
```

-continued

```
    2>set BFI_COUNTER to 0.
  1>if the Random Access procedure is successfully completed (see
    subclause 5.1):
    2>stop the beamFailureRecoveryTimer, if configured;
    2> consider the Beam Failure Recovery procedure successfully
      completed.
*** End ***
```

During RLM, the monitored RSs may be subject to LBT failures. Therefore, a UE may miss one or several RS receptions, which would impact triggering of RLF. In addition, LBT failures will cause a UE to forego or drop certain uplink transmission. This can affect how to manage the counters of different MAC procedures, e.g., preamble counters or scheduling request (SR) counters. For example, if the preamble counter is not incremented, the UE may delay entering RLF procedure, which may be undesirable. One way to mitigate this problem is a separate counter of LBT failures for RA transmission, such that the UE can trigger RLF if the counter reaches a maximum value.

In 3GPP, a beam failure detection (BFD)-like mechanism has been agreed for detection of UL LBT failures. This would reduce the work efforts for the 3GPP to design detection mechanism. The MAC entity may be configured by RRC with a consistent LBT failure recovery procedure. Consistent LBT failure is detected per UL BWP by counting LBT failure indications, for all UL transmissions, from the lower layers to the MAC entity.

In relation to this procedure, RRC layer configures the following parameters in lbt-FailureRecoveryConfig:
  lbt-FailureInstanceMaxCount for the consistent LBT failure detection; and
  lbt-FailureDetectionTimer for the consistent LBT failure detection;

In addition, the UE uses an LBT COUNTER variable for counting indicates of LBT failure detection procedure, with the counter initially set to 0.

For each activated Serving Cell configured with lbt-FailureRecoveryConfig, the following procedural code illustrates a simplified MAC procedure for LBT failure recovery. The detailed procedure would be different depending on whether consistent UL LBT failures are detected in the primary cell (PCell or PSCell) or in an SCell.

```
1> if LBT failure indication has been received from lower layers:
  2> start or restart the lbt-FailureDetectionTimer;
  2> increment LBT_COUNTER by 1;
  2> if LBT_COUNTER >= lbt-FailureInstanceMaxCount:
    3> declare consistent LBT failures for the active UL BWP
```

1> if the lbt-FailureDetectionTimer expires; or
1> if lbt-FailureDetectionTimer or lbt-FailureInstanceMaxCount is reconfigured by upper layers:
2> set LBT_COUNTER to 0.

UL LBT failure handling should be operated per BWP, and as discussed above, a UE may be configured with several BWPs. The UE maintains timer and a counter for each configured BWP. Whenever the UE switches to a different active BWP, the UE uses the timer and the counter in the new active BWP for detection of UL LBT failures. At the same time, the UE resets the timer and the counter in the de-activated BWP. If the active BWP comprises several LBT sub-bands, it is enough for the UE to keep a common counter across LBT sub-bands with the same BWP. In other words, an UL LBT problem is only declared in case the number of LBT failures from all LBT sub-bands has reached a pre-defined counter.

If a UE experiences LBT problems in its current active BWP, it is beneficial for the UE to switch to another BWP prior to triggering a RLF. As such, the UE initiates a RA on an inactive BWP which has PRACH resources configured. Upon reception of the RA, the gNB can decide if the UE needs to switch to the other BWP. The gNB can reply with a DCI or an RRC reconfiguration indicating the new BWP which may be a different one from the BWP selected by the UE for RA. After switching to the new active BWP, the UE can reset the counter for LBT problem detection.

If the UE has detected LBT problems for all configured BWPs with RA configured, the UE may declare an RLF for the cell and trigger RRC connection reestablishment. In case an RLF event is triggered, the UE would follow the existing RRC connection reestablishment procedure to recover from the failure.

For a UE configured with secondary cells (SCells) for carrier aggregation (CA), if the UE has detected consistent UL LBT failures in an SCell, the UE informs the gNB of the occurrence of the LBT failures. The gNB can take appropriate recovery actions, for example, to inactivate or de-configure the cell where the UL LBT failures have been detected. When consistent uplink LBT failures are detected on an SCell, a new MAC CE (e.g., UL LBT failure Indication MAC CE) has been defined to report this occurrence to the node (e.g., gNB) associated with the SCell. The new MAC CE can indicate the cell in which consistent UL LBT failures has been detected. The gNB knows in which BWP the UE is currently active and since a UE only has one active BWP per cell, upon reception of the MAC CE the gNB can understand that the UE has experienced consistent UL LBT failures in its current active BWP in the indicated cell. The MAC CE format supports multiple entries to indicate all the cells which have already declared consistent UL LBT failures.

As such, when consistent UL LBT failures is detected in a BWP of an SCell, the MAC entity will trigger a UL LBT failure Indication MAC CE. If there is available UL grant in any serving cell for a new transmission, the UE will indicate to the multiplexing-and-assembly entity to include a UL LBT failure Indication MAC CE in the subsequent uplink transmission. If there is no UL grant available, the UE shall trigger a scheduling request for requesting new UL resource for the MAC CE.

This new MAC CE is also applicable to a primary cell in CA (e.g., PCell or PSCell). In the primary cell, the UE switches to another BWP and initiates RACH upon declaration of consistent LBT failures. During the RACH procedure especially for a CBRA based procedure, the UE can include the UL LBT failure Indication MAC CE in a message (e.g., Msg3 of the RA procedure) so that the gNB can identify why the RA procedure was triggered by the UE. When consistent uplink LBT failures are detected on the PSCell, the UE informs MN via the SCG failure information procedure after detecting consistent UL LBT failures on all configured BWPs.

Figure 8:
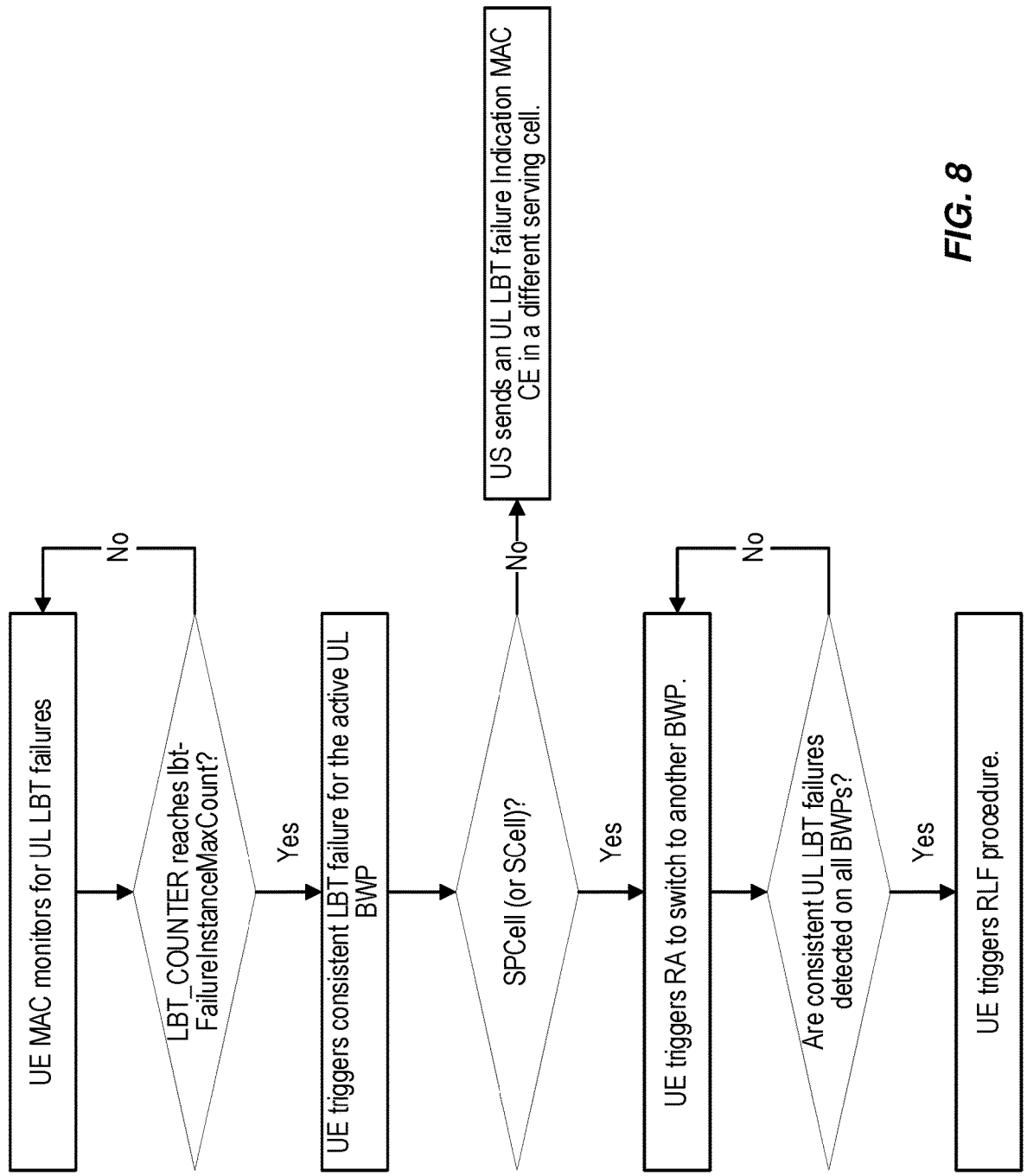
FIG. 8 shows a flowchart illustrating an exemplary listen-before-talk (LBT) recovery procedure for NR.

FIG. 8 shows a flowchart illustrating an exemplary LBT recovery procedure in accordance with the above description.

As explained further in 3GPP TR 38.889 (v16.0.0), directional LBT for beamformed transmissions has been studied for NR unlicensed operation in 5-GHz frequency band. At a high level, the UE performs LBT in the direction of a beam that the UE will use to carry the UL data transmission. Compared to the omni-directional LBT, directional LBT can lead to better channel access probability for the UE such that improved spatial reuse may be achieved. However, multi-beam/multi-SSB operation at sub-7 GHz frequency region may be unnecessary for NR-U. Single beam operation in low frequency unlicensed spectrum (e.g., <7 GHz) provides more benefits to SS/PBCH transmissions compared to beamforming with beam sweeping operation.

In addition, a UE's RF output power is normally restricted for unlicensed spectrum (e.g., due to regulations). This means that if a UE is able to reach maximum output power with an omni-directional transmission, a directional transmission with a high beamforming gain may not give additional coverage in unlicensed spectrum. For these reasons, directional LBT has been down-prioritized for NR-U at sub-7 GHz frequency region and is not supported up to NR Rel-16.

According to the outcome of a study item on Supporting NR above 52.6 GHz, a new 3GPP Rel-17 study idem (SI) or work item (WI) has been agreed upon, with the goal of extend NR licensed and unlicensed operation up to 71 GHz. It is expected that for operations at such high frequencies, directional LBT for beamformed transmissions will be used frequently applied.

As explained in the NR MAC specification 3GPP TS 38.321 (v15.7.0) clause 5.1.2 (Random Access Resource Selection), beam selection for a CFRA-based BFR is described by the following procedural statements:

1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
2>select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
2>if CSI-RS is selected, and there is no ra-PreambleIndex associated with the selected CSI-RS:

```
3>set the PREAMBLE_INDEX to a ra-PreambleIndex corresponding to the SSB in
    candidateBeamRSList which is quasi-colocated with the selected CSI-RS as
    specified in TS 38.214 [7],
2>else:
    3>set the PREAMBLE_INDEX to a ra-PreambleIndex corresponding to the
    selected SSB or CSI-RS from the set of Random Access Preambles for beam
    failure recovery request.
```

Among the SSBs or CSI-RSs with the measured RSRPs above the threshold, the UE selects an SSB or a CSI-RS randomly. Similarly, as explained in 3GPP TS 38.321 (v15.7.0) clause 5.1.2, beam selection for a CBRA-based BFR is described by the following procedural statements:

```
1>else (i.e. for the contention-based Random Access preamble selection):
    2>if at least one of the SSBs with SS-RSRP above rsrp-ThresholdSSB
    is available:
        3>select an SSB with SS-RSRP above rsrp-ThresholdSSB.
    2>else:
        3>select any SSB.
```

Among the SSBs with the measured RSRPs above the threshold, the UE randomly selects an SSB for the RA procedure.

In the above two examples, the UE selects a beam considering only its measured DL RSRP. For a UE with unlicensed operation up to 71 GHz, a selected beam according to SS-RSRP or CSI-RSRP may be subject to LBT failures. However, another beam with lower SS-RSRP or CSI-RSRP may be idle, such that it would be beneficial for the UE to select that beam instead. This would avoid unnecessary LBT operations reduced latency for UL data transmissions by the UE.

Exemplary embodiments of the present disclosure can address these and other issues, problems, and/or difficulties by providing enhanced techniques for selecting beams for RA during NR-U operation when directional LBT is applied. At a high level, in these novel techniques, a UE not only considers a measured DL RSRP for each candidate beam, but also a measured channel occupancy (CO) or directional LBT failure statistic for each candidate beam. The UE then selects the candidate beam having not only a strong signal strength but also a low congestion and/or occupancy.

Such embodiments can provide various improvements, benefits, and/or advantages. For example, such embodiments can cause the UE to avoid being stalled on a serving beam due to occurrence of consistent UL LBT failures. In addition, such embodiments can provide means for a UE to quickly recover from consistent LBT failures on a serving beam. Furthermore, such embodiments can mitigate and/or reduce interruptions to UE services due to LBT failures, thereby facilitating use of services (e.g., eMBB, URLLC, etc.) on unlicensed spectrum.

Various embodiments are described below in the context of NR-U operation. However, NR-U is merely used as an example to facilitate explanation and understanding, such that these and other embodiments are also applicable to other systems arranged for unlicensed operation, such as LTE LAA, MuLteFire, etc. Furthermore, these and other embodiments are also applicable to a licensed operation where the medium or channel is shared between different clients, with each client using a channel sensing mechanism (e.g., LBT) prior to a transmission.

In some embodiments, for a UE supporting unlicensed operation in a frequency region where directional LBT is applied for beamformed transmissions, the UE selects a beam (associated with an SSB or a CSI-RS) not only considering a first metric, such as the measured beam RSRP, but also considering a second metric such as the measured beam channel occupancy or beam LBT failure statistics (i.e., LBT failure ratio or number of LBT failures). The two metrics are expected to be considered via at least one of below options.

In NR Rel-15, a UE is configured with an rsrp-ThresholdSSB or an rsrp-ThresholdCSI-RS for beam selection. In the first option, a separate CO threshold (e.g., co-ThresholdSSB if the beam is associated with an SSB or co-ThresholdCSI-RS if the beam is associated with a CSI-RS) or LBT failure statistics (lbtFailureRatio-ThresholdSSB if the beam is associated with an SSB or lbtFailureRatio-ThresholdCSI-RS if the beam is associated with a CSI-RS) can be introduced for each beam. In this option, UE selects the beam based on two thresholds.

For example, the UE can first select a set of beams (e.g., SSB and/or CSI-RS) with both the first metric (e.g., RSRP) above the first threshold and the second metric (e.g., CO or LBT failure statistics) below the second threshold. If the selected beam set comprises more than one beam, the UE then selects a beam out of the beam set, according to one of the following options: 1) randomly; 2) a beam with highest beam RSRP; or 3) a beam with lowest directional CO or lowest LBT failure ratio or fewest number of LBT failures.

In the second option, there is no second threshold (e.g., for CO or LBT failure statistics). Accordingly, a UE first selects a set of beams with the first metric (e.g., RSRP) above the first threshold, and then selects a beam, from the set, having the lowest directional CO or lowest LBT failure ratio or fewest number of LBT failures.

If no beam satisfies the first threshold (second option) or the first and second thresholds (first option), the set can be referred to as "empty." In such case, the UE can apply another criterion to select a suitable beam. Conventionally, in NR Rel-15, the UE would randomly select a beam. However, this may cause the UE to select a beam which is already congested. Instead, according to embodiments, the UE can select a beam with the lowest second metric (e.g., lowest CO or lowest LBT failure ratio or fewest number of LBT failures) among the set. In case a second threshold for CO or LBT failure statistics is also configured (e.g., first option), the UE can randomly select a beam with a second metric below the second threshold (e.g., in case all beams had first metrics above the first threshold). In case no beam meets the second threshold, the UE can select the beam having the lowest second metric or make a random selection among all candidate beams.

In other embodiments, for each beam, the UE obtains the second metrics (e.g., measurement results of CO or LBT failure statistics) via one of several options. In the first option, if configured, the UE can measure the beam in terms of CO or LBT failure statistics by itself. The measurement may be configured in a periodic fashion. In a variant, since the periodic monitoring may lead to excessive power consumption and therefore degrades the UE battery life, the UE may be configured to only measure/monitor a subset of beams.

In the second option, the gNB can provide the second metrics (e.g., CO or LBT failure statistics) for one or more of the beams to the UE. For example, the gNB can collect and/or aggregate this information from other UEs. The second metric(s) may be provided to the UE via RRC message, MAC CE, or DCI in various embodiments.

In other embodiments, the UE can change to a second beam if it has experienced LBT failures consistently in a first beam. A separate counter and/or timer can be defined and/or configured to facilitate this beam change. For example, the UE can change to the second beam if the count of consecutive LBT failures for the first beam have reached a maximum value. As another example, the UE can change to the second beam if the UE cannot obtain the channel using the first beam before the relevant timer has expired. The UE starts/restarts the timer when a new transmission is triggered by upper layers, and stops the timer upon successful LBT for the first beam. Moreover, once the UE changes to the second beam, it can perform similar timer/counter operations for the second beam.

These and other embodiments can be exemplified by procedural descriptions in a 3GPP specification. For example, the text below shows an excerpt from NR MAC specification 3GPP TS 38.321 (v15.7.0) clause 5.1.2 (Random Access Resource Selection) that has been amended according to embodiments in which a CO threshold is configured as a second threshold for selection of beams. Additions to the specification are shown as underline and deletions are shown as strike-through. In view of the above description and the exemplary text below, skilled persons can readily identify and/or derive similar amendments to 3GPP specification text in relation to other embodiments.

* Begin exemplary 3GPP specification text *
The MAC entity shall:
 1>if the Random Access procedure was initiated for beam failure recovery (as specified in clause 5.17); and
 1>if the beamFailureRecoveryTimer (in clause 5.17) is either running or not configured; and
 1>if the contention-free Random Access Resources for beam failure recovery request associated with any of the SSBs and/or CSI-RSs have been explicitly provided by RRC and directional LBT is configured; and
 1>if at least one of the SSBs fulfil the below conditions:
   2) with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2) with SS-CO below co-ThresholdSSB amongst the SSBs in candidateBeamRSList or the CSI-RSs with CSI-CO below co-ThresholdCSI-RS amongst the CSI-RSs in candidateBeamRSList is available:
   2>select an SSB amongst the SSBs in candidateBeamRSList or a CSI-RS amongst the CSI-RSs in candidateBeamRSList that fulfil the above conditions;
   2>if CSI-RS is selected, and there is no ra-PreambleIndex associated with the selected CSI-RS:
     3>set the PREAMBLE_INDEX to a ra-PreambleIndex corresponding to the SSB in candidateBeamRSList which is quasi-colocated with the selected CSI-RS as specified in TS 38.214 [7],
   2>else:
     3>set the PREAMBLE_INDEX to a ra-PreambleIndex corresponding to the selected SSB or CSI-RS from the set of Random Access Preambles for beam failure recovery request.
 1>else if the ra-PreambleIndex has been explicitly provided by PDCCH; and
 1>if the ra-PreambleIndex is not 0b000000:
   2>set the PREAMBLE_INDEX to the signalled ra-PreambleIndex;
   2>select the SSB signalled by PDCCH.
 1>else if the contention-free Random Access Resources associated with SSBs have been explicitly provided in rach-ConfigDedicated and at least one SSB with SS-RSRP above rsrp-ThresholdSSB and with SS-CO below co-ThresholdSSB amongst the associated SSBs is available:
   2>select an SSB with SS-RSRP above rsrp-ThresholdSSB and with SS-CO below co-ThresholdSSB amongst the associated SSBs;
   2>set the PREAMBLE_INDEX to a ra-PreambleIndex corresponding to the selected SSB.
 1>else if the contention-free Random Access Resources associated with CSI-RSs have been explicitly provided in rach-ConfigDedicated and at least one CSI-RS with CSI-RSRP above rsrp-ThresholdCSI-RS and with SS-CO below co-ThresholdSSB amongst the associated CSI-RSs is available:
   2>select a CSI-RS with CSI-RSRP above rsrp-ThresholdCSI-RS and with SS-CO below co-ThresholdSSB amongst the associated CSI-RSs;
   2>set the PREAMBLE_INDEX to a ra-PreambleIndex corresponding to the selected CSI-RS.
 1>else if the Random Access procedure was initiated for SI request (as specified in TS 38.331 [5]); and
 1>if the Random Access Resources for SI request have been explicitly provided by RRC:
   2>if at least one of the SSBs with SS-RSRP above rsrp-ThresholdSSB and with SS-CO below co-ThresholdSSB is available:
     3>select an SSB with SS-RSRP above rsrp-ThresholdSSB and with SS-CO below co-ThresholdSSB.

```
    2>else:
        3>select an SSB with lowest SS-CO.
    2>select a Random Access Preamble corresponding to the selected SSB, from the
        Random Access Preamble(s) determined according to ra-PreambleStartIndex as
        specified in TS 38.331 [5];
    2>set the PREAMBLE_INDEX to selected Random Access Preamble.
1>else (i.e. for the contention-based Random Access preamble selection):
    2>if at least one of the SSBs with SS-RSRP above rsrp-ThresholdSSB and with SS-
        CO below co-ThresholdSSB is available:
        3>select an SSB with SS-RSRP above rsrp-ThresholdSSB and with SS-CO below
            co-ThresholdSSB.
    2>else:
        3>select an SSB with lowest SS-CO.
    2>if Msg3 has not yet been transmitted:
        3>if Random Access Preambles group B is configured:
            4>if the potential Msg3 size (UL data available for transmission plus MAC
                header and, where required, MAC CEs) is greater than ra-Msg3SizeGroupA
                and the pathloss is less than PCMAX (of the Serving Cell performing the
                Random Access Procedure) - preambleReceivedTargetPower - msg3-
                DeltaPreamble - messagePowerOffsetGroupB; or
            4>if the Random Access procedure was initiated for the CCCH logical channel
                and the CCCH SDU size plus MAC subheader is greater than ra-
                Msg3SizeGroupA:
                5>select the Random Access Preambles group B.
            4>else:
                5>select the Random Access Preambles group A.
        3>else:
            4>select the Random Access Preambles group A.
    2>else (i.e. Msg3 is being retransmitted):
        3>select the same group of Random Access Preambles as was used for the
            Random Access Preamble transmission attempt corresponding to the first
            transmission of Msg3.
    2>select a Random Access Preamble randomly with equal probability from the
        Random Access Preambles associated with the selected SSB and the selected
        Random Access Preambles group.
    2>set the PREAMBLE_INDEX to the selected Random Access Preamble.
1>if the Random Access procedure was initiated for SI request (as specified in TS
    38.331 [5]); and
1>if ra-AssociationPeriodIndex and si-RequestPeriod are configured:
    2>determine the next available PRACH occasion from the PRACH occasions
        corresponding to the selected SSB in the association period given by ra-
        AssociationPeriodIndex in the si-RequestPeriod permitted by the restrictions given
        by the ra-ssb-OccasionMaskIndex if configured (the MAC entity shall select a
        PRACH occasion randomly with equal probability amongst the consecutive
        PRACH occasions according to clause 8.1 of TS 38.213 [6] corresponding to the
        selected SSB).
1>else if an SSB is selected above:
    2>determine the next available PRACH occasion from the PRACH occasions
        corresponding to the selected SSB permitted by the restrictions given by the ra-
        ssb-OccasionMaskIndex if configured or indicated by PDCCH (the MAC entity
        shall select a PRACH occasion randomly with equal probability amongst the
        consecutive PRACH occasions according to clause 8.1 of TS 38.213 [6],
        corresponding to the selected SSB; the MAC entity may take into account the
        possible occurrence of measurement gaps when determining the next available
        PRACH occasion corresponding to the selected SSB).
1>else if a CSI-RS is selected above:
    2>if there is no contention-free Random Access Resource associated with the selected
        CSI-RS:
        3>determine the next available PRACH occasion from the PRACH occasions,
            permitted by the restrictions given by the ra-ssb-OccasionMaskIndex if
            configured, corresponding to the SSB in candidateBeamRSList which is quasi-
            colocated with the selected CSI-RS as specified in TS 38.214 [7] (the MAC
            entity shall select a PRACH occasion randomly with equal probability amongst
            the consecutive PRACH occasions according to clause 8.1 of TS 38.213 [6],
            corresponding to the SSB which is quasi-colocated with the selected CSI-RS;
            the MAC entity may take into account the possible occurrence of measurement
            gaps when determining the next available PRACH occasion corresponding to
            the SSB which is quasi-colocated with the selected CSI-RS).
    2>else:
        3>determine the next available PRACH occasion from the PRACH occasions in
            ra-OccasionList corresponding to the selected CSI-RS (the MAC entity shall
            select a PRACH occasion randomly with equal probability amongst the PRACH
            occasions occurring simultaneously but on different subcarriers, corresponding
            to the selected CSI-RS; the MAC entity may take into account the possible
            occurrence of measurement gaps when determining the next available PRACH
            occasion corresponding to the selected CSI-RS).
1>perform the Random Access Preamble transmission procedure (see clause 5.1.3).
*** End exemplary 3GPP specification text ***
```

These embodiments described above can be further illustrated with reference to FIGS. 9 and 13, which depicts exemplary methods performed by a UE and a network node, respectively. In other words, various features of the operations described below, with reference to FIGS. 9 and 13, correspond to various embodiments described above.

Figure 9:
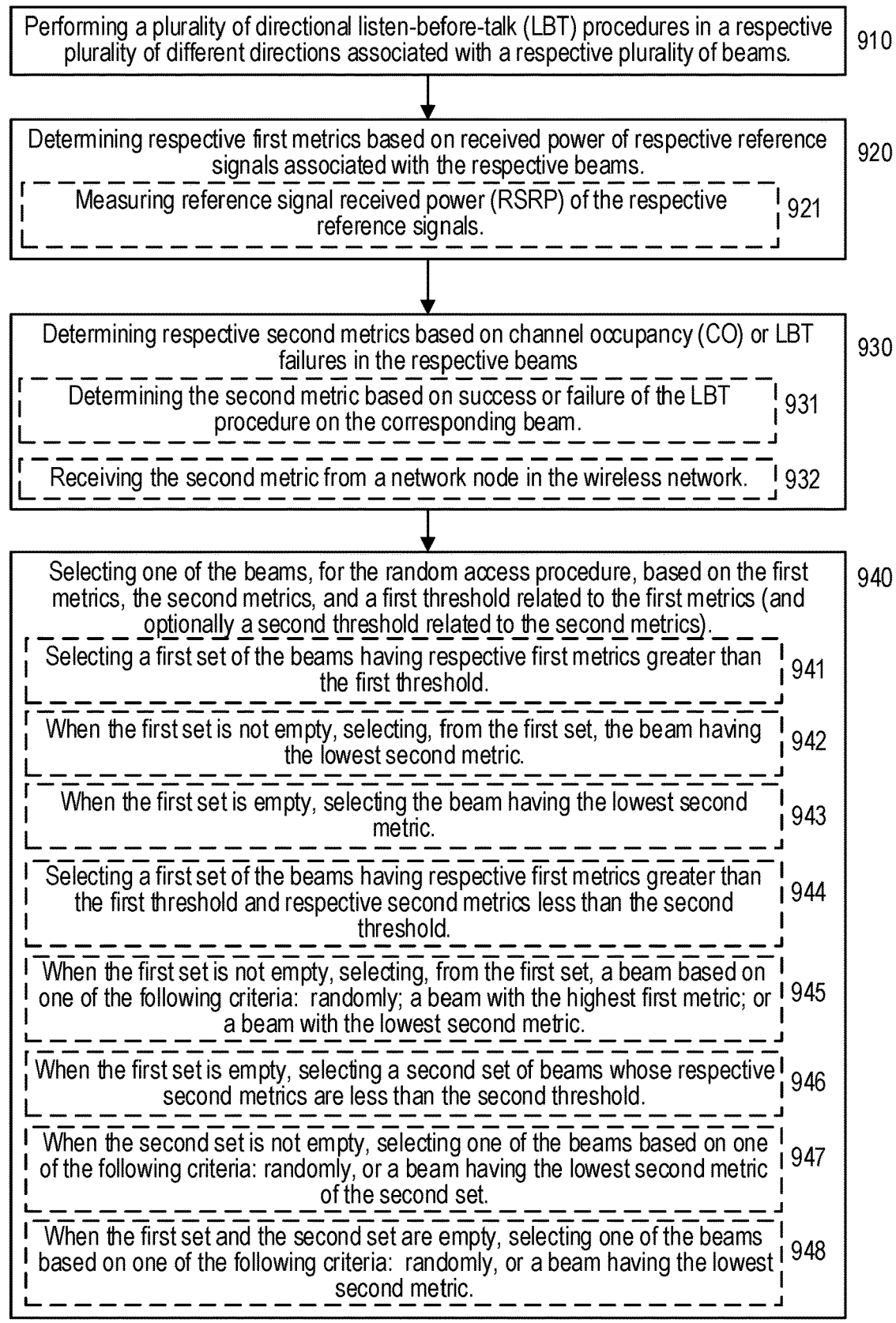
FIG. 9 shows a flow diagram of an exemplary method (e.g., procedure) performed by a user equipment (UE, e.g., wireless device, IoT device, etc.), according to various exemplary embodiments of the present disclosure.

In particular, FIG. 9 shows a flow diagram of an exemplary method (e.g., procedure) for selecting a directional beam for a random access procedure in a wireless network, according to various exemplary embodiments of the present disclosure. The exemplary method can be performed by a user equipment (UE, e.g., wireless device, IoT device, modem, etc. or component thereof) in communication with a network node (e.g., base station, eNB, gNB, en-gNB, etc., or component thereof) in the wireless network (e.g., E-UTRAN, NG-RAN). For example, the exemplary method shown in FIG. 9 can be implemented in a UE configured as described herein with reference to other figures. In addition, the exemplary method shown in FIG. 9 can be used cooperatively with other exemplary methods described herein (e.g., FIG. 13) to provide various exemplary advantages described here. Although FIG. 9 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 9 can include the operations of blocks 910, where the UE can perform a plurality of directional listen-before-talk (LBT) procedures in a respective plurality of different directions associated with a respective plurality of beams. The UE can perform these directional LBT procedures, for example, when the UE wants to select a directional beam for a RA procedure, such as part of an RRC reestablishment, as discussed above. Alternately, the UE can perform these directional LBT procedures when it has UL data for transmission to the wireless network.

In some embodiments, the directional LBT procedures (e.g., of block 910) can be performed in unlicensed frequency spectrum. In such embodiments, the wireless network can be one of the following: an NG-RAN configured to support NR-U operation (e.g., above 52.6 GHz, as discussed above); or an E-UTRAN configured to support LTE licensed assisted access (LAA) operation (e.g., around 5 GHz).

The exemplary method can also include the operations of block 920, where the UE can determine respective first metrics based on received power of respective reference signals associated with the respective beams. In some embodiments, the respective reference signals can include SSB/PBCH Block (SSB) and/or channel state information reference signals (CSI-RS). In some embodiments, the determining operations of block 920 can include the operations of sub-block 921, where the UE can measure reference signal received power (RSRP) of the respective reference signals. For example, the UE can measure SS-RSRP and/or CSI-RSRP, as discussed above. In such embodiments, the RSRP measurements can comprise the first metrics.

The exemplary method can also include the operations of block 930, where the UE can determine respective second metrics based on channel occupancy (CO) or LBT failures in the respective beams. For example, the respective second metrics can be SS-CO or CSI-CO, as discussed above. In some embodiments, the determining operations of block 930 can include the operations of one of sub-blocks 931 and 932, for each of the respective second metrics. In sub-block 931, the UE can determine the second metric based on success or failure of the LBT procedure on the corresponding beam. In sub-block 932, the UE can receive the second metric from a network node in the wireless network. In this manner, the UE can apply sub-block 931 for some portion of the beams (from none to all) and sub-block 932 for the remaining portion of the beams.

The exemplary method can also include the operations of block 940, where the UE can select one of the beams to be used for the random access procedure based on the first metrics and the second metrics. In some embodiments, the selected beam can fulfill the following conditions:
 a received power value of the associated reference signal is above a first pre-defined threshold associated with the first metrics; and
 either a CO value of the associated reference signal is below a second pre-defined threshold associated with the second metrics, or an LBT failure value is below a second pre-defined threshold associated with the second metrics.

In some embodiments, the selection operations of block 940 can include the operations of sub-blocks 941-942. In sub-block 941, the UE can select a first set of the beams having respective first metrics greater than a first threshold. For example, the first threshold can be rsrp-ThresholdSSB or rsrp-ThresholdCSI-RS mentioned above. In sub-block 942, the UE can, when the first set is not empty, select, from the first set, the beam having the lowest second metric. In some of these embodiments, the selection operations of block 940 can also include the operations of sub-block 942, where the UE can, when the first set is empty, select the beam having the lowest second metric.

In other embodiments, the selection operations of block 940 can include the operations of sub-blocks 944-945. In sub-block 944, the UE can select a first set of the beams having respective first metrics greater than the first threshold (e.g., rsrp-ThresholdSSB or rsrp-ThresholdCSI-RS) and respective second metrics are less than a second threshold. For example, the second threshold can be co-ThresholdSSB or co-ThresholdCSI-RS mentioned above. In sub-block 945, the UE can, when the first set is not empty, select, from the first set, a beam based on one of the following criteria:
 randomly;
 a beam with the highest first metric; or
 a beam with the lowest second metric.

In some of these embodiments, the selection operations of block 940 can also include the operations of sub-blocks 946-947. In sub-block 946, the UE can, when the first set is empty, select a second set of beams having respective second metrics less than the second threshold. In sub-block 948, when the second set is not empty, the UE can select one of the beams based on one of the following criteria:
 randomly; or
 a beam having the lowest second metric of the second set.

In some of these embodiments, the selection operations of block 940 can also include the operations of sub-block 948 where the UE can, when the first set and the second set are empty, select one of the beams based on one of the following criteria:
 randomly; or
 a beam having the lowest second metric.

In some embodiments, the UE can be served by a first beam. In such embodiments, the selection operations of block 940 (including various sub-blocks of embodiments) can be for selecting a beam other than the first beam, and can be in response to one of the following:

a count of consecutive LBT failures, on the first beam, has exceeded a maximum amount; or expiration of a timer without a successful LBT procedure on the first beam while the timer was running.

In these embodiments, the UE can utilize various timers and/or counters to facilitate such techniques, as discussed in more detail above.

In addition, FIG. 13 shows a flow diagram of an exemplary method (e.g., procedure) for configuring random access procedures by user equipment (UEs) in a wireless network, according to various exemplary embodiments of the present disclosure. The exemplary method can be performed by a network node (e.g., base station, eNB, gNB, en-gNB, etc., or component thereof) in the wireless network (e.g., E-UTRAN, NG-RAN). For example, the exemplary method shown in FIG. 13 can be implemented in a network node configured as described herein with reference to other figures. In addition, the exemplary method shown in FIG. 13 can be used cooperatively with other exemplary methods described herein (e.g., FIG. 9) to provide various exemplary advantages described here. Although FIG. 13 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 13 can include the operations of blocks 1310, where the network node can configure one or more UEs with information that facilitates selection, by each UE, of a beam to be used for a random access procedure in the wireless network. The information can include one or more of the following:

first thresholds related to UE received power of respective reference signals associated with a respective plurality of beams in a respective plurality of directions (e.g., rsrp-ThresholdSSB or rsrp-ThresholdCSI-RS);

second thresholds related to UE channel occupancy, CO, or listen-before-talk, LBT, failures in the respective beams (e.g., co-ThresholdSSB or co-ThresholdCSI-RS); and one or more conditions for UE beam reselection based on a number of UE LBT failures and/or a time between successful UE LBT procedures on each respective beam.

In some embodiments, the one or more conditions can include one or more of the following:

a maximum count of consecutive UE LBT failures, on each of the respective beams, that triggers UE beam reselection; and a maximum time between successful UE LBT procedures, on each of the respective beams, that triggers UE beam reselection.

In some embodiments, the exemplary method can also include the operations of block 1320, where the network node can transmit the plurality of beams, including the associated reference signals, in the respective plurality of directions. In some embodiments, the respective reference signals include SSB/PBCH Block (SSB) and/or channel state information reference signals (CSI-RS).

In some embodiments, the respective reference signals associated with the respective beams can be in unlicensed frequency spectrum. In such embodiments, the wireless network can be one of the following: an NG-RAN configured to support NR-U operation (e.g., above 52.6 GHz, as discussed above); or an E-UTRAN configured to support LTE licensed assisted access (LAA) operation (e.g., around 5 GHz).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 10:
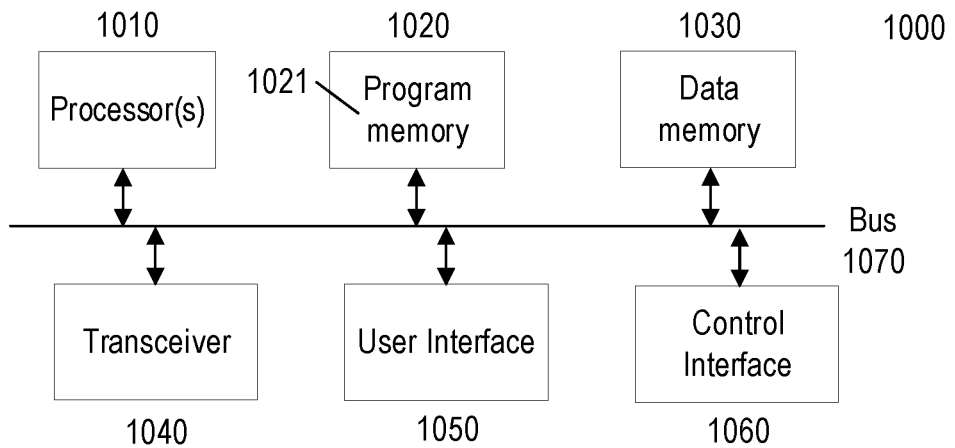
FIG. 10 is a block diagram of an exemplary wireless device or UE according to various exemplary embodiments of the present disclosure.

FIG. 10 shows a block diagram of an exemplary wireless device or user equipment (UE) 1000 (hereinafter referred to as "UE 1000") according to various embodiments of the present disclosure, including those described above with reference to other figures. For example, UE 1000 can be configured by execution of instructions, stored on a computer-readable medium, to perform operations corresponding to one or more of the exemplary methods described herein.

UE 1000 can include a processor 1010 (also referred to as "processing circuitry") that can be operably connected to a program memory 1020 and/or a data memory 1030 via a bus 1070 that can comprise parallel address and data buses, serial ports, or other methods and/or structures known to those of ordinary skill in the art. Program memory 1020 can store software code, programs, and/or instructions (collectively shown as computer program product 1021 in FIG. 10) that, when executed by processor 1010, can configure and/or facilitate UE 1000 to perform various operations, including operations corresponding to various exemplary methods described herein. As part of or in addition to such operations, execution of such instructions can configure and/or facilitate UE 1000 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1040, user interface 1050, and/or control interface 1060.

As another example, processor 1010 can execute program code stored in program memory 1020 that corresponds to MAC, RLC, PDCP, and RRC layer protocols standardized by 3GPP (e.g., for NR and/or LTE). As a further example, processor 1010 can execute program code stored in program memory 1020 that, together with radio transceiver 1040, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1010 can execute program code stored in program memory 1020 that, together with radio transceiver 1040, implements device-to-device (D2D) communications with other compatible devices and/or UEs.

Program memory 1020 can also include software code executed by processor 1010 to control the functions of UE 1000, including configuring and controlling various components such as radio transceiver 1040, user interface 1050, and/or control interface 1060. Program memory 1020 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1020 can comprise an external storage arrangement (not shown) remote from UE 1000, from which the instructions can be downloaded into program memory 1020 located within or removably coupled to UE 1000, so as to enable execution of such instructions.

Data memory 1030 can include memory area for processor 1010 to store variables used in protocols, configuration, control, and other functions of UE 1000, including operations corresponding to, or comprising, any of the exemplary methods described herein. Moreover, program memory 1020 and/or data memory 1030 can include non-volatile memory (e.g., flash memory), volatile memory (e.g., static or dynamic RAM), or a combination thereof. Furthermore, data memory 1030 can comprise a memory slot by which removable memory cards in one or more formats (e.g., SD Card, Memory Stick, Compact Flash, etc.) can be inserted and removed.

Persons of ordinary skill will recognize that processor 1010 can include multiple individual processors (including, e.g., multi-core processors), each of which implements a portion of the functionality described above. In such cases, multiple individual processors can be commonly connected to program memory 1020 and data memory 1030 or individually connected to multiple individual program memories and or data memories. More generally, persons of ordinary skill in the art will recognize that various protocols and other functions of UE 1000 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1040 can include radio-frequency transmitter and/or receiver functionality that facilitates the UE 1000 to communicate with other equipment supporting like wireless communication standards and/or protocols. In some exemplary embodiments, the radio transceiver 1040 includes one or more transmitters and one or more receivers that enable UE 1000 to communicate according to various protocols and/or methods proposed for standardization by 3GPP and/or other standards bodies. For example, such functionality can operate cooperatively with processor 1010 to implement a PHY layer based on OFDM, OFDMA, and/or SC-FDMA technologies, such as described herein with respect to other figures.

In some exemplary embodiments, radio transceiver 1040 includes one or more transmitters and one or more receivers that can facilitate the UE 1000 to communicate with various LTE, LTE-Advanced (LTE-A), and/or NR networks according to standards promulgated by 3GPP. In some exemplary embodiments of the present disclosure, the radio transceiver 1040 includes circuitry, firmware, etc. necessary for the UE 1000 to communicate with various NR, NR-U, LTE, LTE-A, LTE-LAA, UMTS, and/or GSM/EDGE networks, also according to 3GPP standards. In some embodiments, radio transceiver 1040 can include circuitry supporting D2D communications between UE 1000 and other compatible devices.

In some embodiments, radio transceiver 1040 includes circuitry, firmware, etc. necessary for the UE 1000 to communicate with various CDMA2000 networks, according to 3GPP2 standards. In some embodiments, the radio transceiver 1040 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1040 can include a transceiver that is capable of wired communication, such as by using IEEE 802.3 Ethernet technology. The functionality particular to each of these embodiments can be coupled with and/or controlled by other circuitry in the UE 1000, such as the processor 1010 executing program code stored in program memory 1020 in conjunction with, and/or supported by, data memory 1030.

User interface 1050 can take various forms depending on the particular embodiment of UE 1000, or can be absent from UE 1000 entirely. In some embodiments, user interface 1050 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1000 can comprise a tablet computing device including a larger touchscreen display. In such embodiments, one or more of the mechanical features of the user interface 1050 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1000 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1000 having a touch screen display are capable of receiving user inputs, such as inputs related to exemplary methods described herein or otherwise known to persons of ordinary skill.

In some embodiments, UE 1000 can include an orientation sensor, which can be used in various ways by features and functions of UE 1000. For example, the UE 1000 can use outputs of the orientation sensor to determine when a user has changed the physical orientation of the UE 1000's touch screen display. An indication signal from the orientation sensor can be available to any application program executing on the UE 1000, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1060 of the UE 1000 can take various forms depending on the particular exemplary embodiment of UE 1000 and of the particular interface requirements of other devices that the UE 1000 is intended to communicate with and/or control. For example, the control interface 1060 can comprise an RS-232 interface, an RS-4105 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1060 can comprise an IEEE 802.3 Ethernet interface such as described above. In some exemplary embodiments of the present disclosure, the control interface 1060 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1000 can comprise more functionality than is shown in FIG. 10 including, for example, a video and/or still-image camera, microphone, media player and/or recorder, etc. Moreover, radio transceiver 1040 can include circuitry necessary to communicate using additional radio-frequency communication standards including Bluetooth, GPS, and/or others. Moreover, the processor 1010 can execute software code stored in the program memory 1020 to control such additional functionality. For example, directional velocity and/or position estimates output from a GPS receiver can be available to any application program executing on the UE 1000, including any program code corresponding to and/or embodying any exemplary embodiments (e.g., of methods) described herein.

Figure 11:
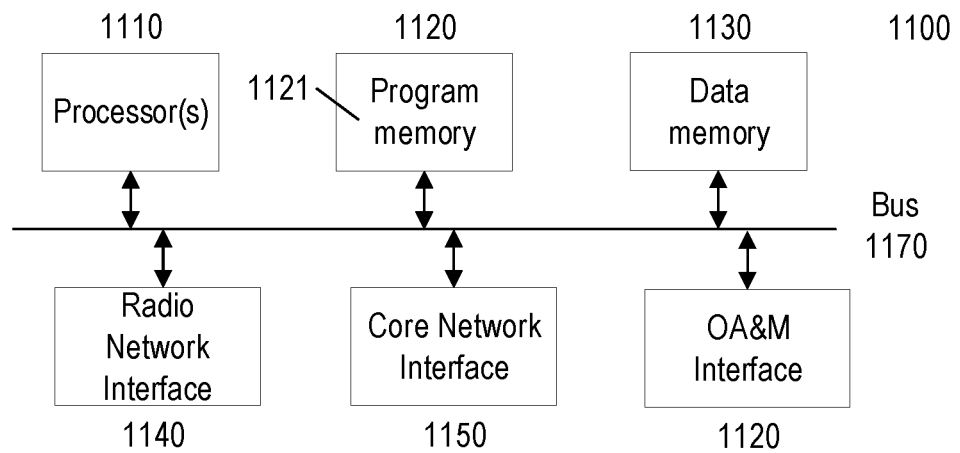
FIG. 11 is a block diagram of an exemplary network node according to various exemplary embodiments of the present disclosure.

FIG. 11 shows a block diagram of an exemplary network node 1100 according to various embodiments of the present disclosure, including those described above with reference to other figures. For example, exemplary network node 1100 can be configured by execution of instructions, stored on a computer-readable medium, to perform operations corresponding to one or more of the exemplary methods described herein. In some exemplary embodiments, network node 1100 can comprise a base station, eNB, gNB, or one or more components thereof. For example, network node 1100 can be configured as a central unit (CU) and one or more distributed units (DUs) according to NR gNB architectures specified by 3GPP. More generally, the functionally of network node 1100 can be distributed across various physical devices and/or functional units, modules, etc.

Network node 1100 can include processor 1110 (also referred to as "processing circuitry") that is operably connected to program memory 1120 and data memory 1130 via bus 1170, which can include parallel address and data buses, serial ports, or other methods and/or structures known to those of ordinary skill in the art.

Program memory 1120 can store software code, programs, and/or instructions (collectively shown as computer program product 1121 in FIG. 11) that, when executed by processor 1110, can configure and/or facilitate network node 1100 to perform various operations, including operations corresponding to various exemplary methods described herein. As part of and/or in addition to such operations, program memory 1120 can also include software code executed by processor 1110 that can configure and/or facilitate network node 1100 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1140 and/or core network interface 1150. By way of example, core network interface 1150 can comprise the S1 or NG interface and radio network interface 1140 can comprise the Uu interface, as standardized by 3GPP. Program memory 1120 can also comprise software code executed by processor 1110 to control the functions of network node 1100, including configuring and controlling various components such as radio network interface 1140 and core network interface 1150.

Data memory 1130 can comprise memory area for processor 1110 to store variables used in protocols, configuration, control, and other functions of network node 1100. As such, program memory 1120 and data memory 1130 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1110 can include multiple individual processors (not shown), each of which implements a portion of the functionality described above. In such case, multiple individual processors may be commonly connected to program memory 1120 and data memory 1130 or individually connected to multiple individual program memories and/or data memories. More generally, persons of ordinary skill will recognize that various protocols and other functions of network node 1100 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1140 can comprise transmitters, receivers, signal processors, ASICs, antennas, beamforming units, and other circuitry that enables network node 1100 to communicate with other equipment such as, in some embodiments, a plurality of compatible user equipment (UE). In some embodiments, interface 1140 can also enable network node 1100 to communicate with compatible satellites of a satellite communication network. In some exemplary embodiments, radio network interface 1140 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1140. According to further exemplary embodiments of the present disclosure, the radio network interface 1140 can comprise a PHY layer based on OFDM, OFDMA, and/or SC-FDMA technologies. In some embodiments, the functionality of such a PHY layer can be provided cooperatively by radio network interface 1140 and processor 1110 (including program code in memory 1120).

Core network interface 1150 can comprise transmitters, receivers, and other circuitry that enables network node 1100 to communicate with other equipment in a core network such as, in some embodiments, circuit-switched (CS) and/or packet-switched Core (PS) networks. In some embodiments, core network interface 1150 can comprise the S1 interface standardized by 3GPP. In some embodiments, core network interface 1150 can comprise the NG interface standardized by 3GPP. In some exemplary embodiments, core network interface 1150 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1150 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1100 can include hardware and/or software that configures and/or facilitates network node 1100 to communicate with other network nodes in a RAN, such as with other eNBs, gNBs, ng-eNBs, en-gNBs, IAB nodes, etc. Such hardware and/or software can be part of radio network interface 1140 and/or core network interface 1150, or it can be a separate functional unit (not shown). For example, such hardware and/or software can configure and/or facilitate network node 1100 to communicate with other RAN nodes via the X2 or Xn interfaces, as standardized by 3GPP.

OA&M interface 1160 can comprise transmitters, receivers, and other circuitry that enables network node 1100 to communicate with external networks, computers, databases, and the like for purposes of operations, administration, and maintenance of network node 1100 or other network equipment operably connected thereto. Lower layers of OA&M interface 1160 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1140, core network interface 1150, and OA&M interface 1160 may be multiplexed together on a single physical interface, such as the examples listed above.

Figure 12:
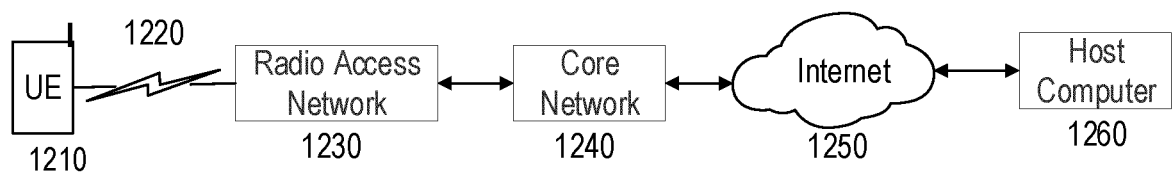
FIG. 12 is a block diagram of an exemplary network configured to provide over-the-top (OTT) data services between a host computer and a UE, according to various exemplary embodiments of the present disclosure.

FIG. 12 is a block diagram of an exemplary communication network configured to provide over-the-top (OTT) data services between a host computer and a user equipment (UE), according to one or more exemplary embodiments of the present disclosure. UE 1210 can communicate with radio access network (RAN) 1230 over radio interface 1220, which can be based on protocols described above including, e.g., LTE, LTE-A, and 5G/NR. For example, UE 1210 can be configured and/or arranged as shown in other figures discussed above.

RAN 1230 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1230 can cooperatively operate using licensed and unlicensed spectrum. In some embodiments, RAN 1230 can include, or be capable of communication with, one or more satellites comprising a satellite access network.

RAN 1230 can further communicate with core network 1240 according to various protocols and interfaces described above. For example, one or more apparatus (e.g., base stations, eNBs, gNBs, etc.) comprising RAN 1230 can communicate to core network 1240 via core network interface 1250 described above. In some exemplary embodiments, RAN 1230 and core network 1240 can be configured and/or arranged as shown in other figures discussed above. For example, eNBs comprising an E-UTRAN 1230 can communicate with an EPC core network 1240 via an S1 interface. As another example, gNBs and ng-eNBs comprising an NG-RAN 1230 can communicate with a 5GC core network 1230 via an NG interface.

Core network 1240 can further communicate with an external packet data network, illustrated in FIG. 12 as Internet 1250, according to various protocols and interfaces known to persons of ordinary skill in the art. Many other devices and/or networks can also connect to and communicate via Internet 1250, such as exemplary host computer 1260. In some exemplary embodiments, host computer 1260 can communicate with UE 1210 using Internet 1250, core network 1240, and RAN 1230 as intermediaries. Host computer 1260 can be a server (e.g., an application server) under ownership and/or control of a service provider. Host computer 1260 can be operated by the OTT service provider or by another entity on the service provider's behalf.

For example, host computer 1260 can provide an over-the-top (OTT) packet data service to UE 1210 using facilities of core network 1240 and RAN 1230, which can be unaware of the routing of an outgoing/incoming communication to/from host computer 1260. Similarly, host computer 1260 can be unaware of routing of a transmission from the host computer to the UE, e.g., the routing of the transmission through RAN 1230. Various OTT services can be provided using the exemplary configuration shown in FIG. 12 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 12 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide enhanced techniques for selecting beams for random during unlicensed (e.g., NR-U) operation when directional listen-before-talk (LBT) is used by a UE. Such embodiments can cause the UE to avoid being stalled on a serving beam due to occurrence of consistent UL LBT failures, and can provide a way for a UE to quickly recover from consistent LBT failures on a serving beam. Furthermore, such embodiments can mitigate and/or reduce interruptions to UE services due to LBT failures, thereby facilitating use of services (e.g., eMBB, URLLC, etc.) on unlicensed spectrum. When used in NR UEs (e.g., UE 1210) and gNBs (e.g., gNBs comprising RAN 1230), exemplary embodiments described herein can provide various improvements, benefits, and/or advantages that facilitate and/or improve the use of data services (e.g., URLLC) in unlicensed spectrum. As a consequence, this improves the performance of these services as experienced by OTT service providers and end-users, including more consistent data throughout and lower latency without excessive UE power consumption or other reductions in user experience.

The invention claimed is:

1. A method by a user equipment (UE) for performing a random access procedure in a wireless network, the method comprising:
  performing a plurality of directional listen-before-talk (LBT) procedures in a respective plurality of different directions associated with a respective plurality of beams;
  determining respective first metrics based on received power of respective reference signals associated with the respective beams;
  determining respective second metrics based on channel occupancy (CO) or LBT failures in the respective beams; and selecting one of the beams to be used for the random access procedure based on the first metrics and the second metrics.

2. The method of claim 1, wherein the respective reference signals include one or more of the following: SSB/PBCH Block (SSB), and channel state information reference signals (CSI-RS).

3. The method of claim 1, wherein determining the respective first metrics comprises measuring reference signal received power (RSRP) of the respective reference signals.

4. The method of claim 1, wherein determining the respective second metrics comprises one of the following for each second metric:
 determining the second metric based on success or failure of the LBT procedure on the corresponding beam; or
 receiving the second metric from a network node in the wireless network.

5. The method of claim 1, wherein selecting one of the beams comprises:
 selecting a first set of the beams having respective first metrics greater than a first threshold; and
 when the first set is not empty, selecting from the first set a beam having the lowest second metric.

6. The method of claim 5, wherein selecting one of the beams further comprises, when the first set is empty, selecting a beam having the lowest second metric.

7. The method of claim 1, wherein selecting one of the directional beams comprises:
 selecting a first set of the beams having respective first metrics greater than a first threshold and respective second metrics less than a second threshold;
 when the first set is not empty, selecting a beam from the first set based on one of the following criteria: randomly, a highest first metric of the first set, or a lowest second metric of the first set.

8. The method of claim 7, wherein selecting one of the beams further comprises, when the first set is empty:
 selecting a second set of beams having respective second metrics less than the second threshold; and
 when the second set is not empty, selecting a beam from the second set based on one of the following criteria: randomly, or a lowest second metric of the second set.

9. The method of claim 8, wherein selecting one of the beams further comprises, when the first set and the second set are empty, selecting one of the directional beams based on one of the following criteria: randomly, or a beam with the lowest second metric.

10. The method of claim 1, wherein:
 the UE is served by a first beam; and
 selecting one of the beams, other than the first beam, is in response to one of the following:
  a count of consecutive LBT failures, on the first beam, has exceeded a maximum amount; or
  expiration of a timer without a successful LBT procedure on the first beam while the timer was running.

11. The method of claim 1, wherein:
 the directional LBT procedures are performed in unlicensed frequency spectrum; and
 the wireless network is one of the following:
  an NG-RAN configured to support NR unlicensed (NR-U) operation; or
  an E-UTRAN configured to support LTE licensed assisted access (LAA) operation.

12. The method of claim 1, wherein the selected beam fulfills the following conditions:
 a received power value of the associated reference signal is above a first pre-defined threshold associated with the first metrics; and
 either a channel occupancy (CO) value of the associated reference signal is below a second pre-defined threshold associated with the second metrics, or an LBT failure value is below a second pre-defined threshold associated with the second metrics.

13. A user equipment (UE) configured to perform a random access procedure in a wireless network, the UE comprising:
 radio transceiver circuitry configured to communicate with a network node in the wireless network; and
 processing circuitry operatively coupled to the radio transceiver circuitry, whereby the processing circuitry and the radio transceiver circuitry are configured to:
  perform a plurality of directional listen-before-talk (LBT) procedures in a respective plurality of different directions associated with a respective plurality of beams;
  determine respective first metrics based on received power of respective reference signals associated with the respective beams;
  determine respective second metrics based on channel occupancy (CO) or LBT failures in the respective beams; and
  select one of the beams to be used for the random access procedure based on the first metrics and the second metrics.

14. A non-transitory, computer-readable medium storing computer-executable instructions that, when executed by processing circuitry of a user equipment (UE) configured to perform a random access procedure in a wireless network, configure the UE to perform operations corresponding to the method of claim 1.

* * * * *